US005825807A

United States Patent [19]
Kumar

[11] Patent Number: 5,825,807
[45] Date of Patent: Oct. 20, 1998

[54] SYSTEM AND METHOD FOR MULTIPLEXING A SPREAD SPECTRUM COMMUNICATION SYSTEM

[76] Inventor: Derek D. Kumar, 2313 Blackthorn Dr., Champaign, Ill. 61821

[21] Appl. No.: 554,364

[22] Filed: Nov. 6, 1995

[51] Int. Cl.$^6$ ............................... H04B 1/69; H04J 11/00
[52] U.S. Cl. ............................ 375/200; 370/203; 371/30
[58] Field of Search ................................. 375/200, 205, 375/295, 316; 370/203, 208; 371/30

[56] References Cited

U.S. PATENT DOCUMENTS

| | | |
|---|---|---|
| 2,941,202 | 6/1960 | Harris, Jr. et al. . |
| 4,247,943 | 1/1981 | Malm . |
| 4,301,530 | 11/1981 | Gutleber . |
| 4,460,992 | 7/1984 | Gutleber . |
| 4,472,815 | 9/1984 | Gutleber . |
| 4,475,214 | 10/1984 | Gutleber . |
| 4,494,228 | 1/1985 | Gutleber . |
| 4,587,662 | 5/1986 | Langewellpott . |
| 4,680,777 | 7/1987 | Saha . |
| 4,700,363 | 10/1987 | Tomlinson et al. . |
| 4,730,340 | 3/1988 | Frazier, Jr. . |
| 4,730,344 | 3/1988 | Saha . |
| 5,063,560 | 11/1991 | Yerbury et al. . |
| 5,081,643 | 1/1992 | Schilling . |
| 5,081,645 | 1/1992 | Resnikoff et al. . |
| 5,184,135 | 2/1993 | Paradise . |
| 5,204,874 | 4/1993 | Falconer et al. . |
| 5,214,656 | 5/1993 | Chung et al. . |

(List continued on next page.)

FOREIGN PATENT DOCUMENTS

| | | |
|---|---|---|
| 2041279 | 10/1992 | Canada . |
| WO 95/24773 | 9/1995 | WIPO . |
| WO9602101 | 1/1996 | WIPO . |

OTHER PUBLICATIONS

"A New Multilevel Coding Method Using Error Correcting Codes," IEEE Transactions on Information Theory, vol. 23, No. 3, pp. 371–377, May, 1977 by H. Imai and S. Hirakawa.

"Multilevel Codes Based on Partitioning", IEEE Transactions on Information Theory, vol. 35, No. 1, pp. 87–98; Jan. 1989 by G. J. Pottie and D. P. Taylor.

"Multistage Coding and Decoding for a M–PSK System", IEEE Globecom '90, Dec. 2–5, 1990, San Diego, CA, pp. 698–703, by T. Woerz and J. Hagenauer.

"Multilevel Trellis Coded Modulations for the Rayleigh Fading Channel", IEEE Transactions on Communications, vol. 41, No. 9, pp. 1300–1310, Sep., 1993, by N. Seshadri and C.E.W. Sundberg.

(List continued on next page.)

*Primary Examiner*—Temesghen Ghebrietinsae
*Attorney, Agent, or Firm*—Joseph A. Rhoa

[57] ABSTRACT

A method and system are provided for the synchronous transmission and reception of multiplexed digital signals such as spread spectrum. The system uses biorthogonal modulation of a plurality of orthogonal signals, preferably wideband, together with simultaneous orthogonal multiplexing. The method is found to significantly mitigate the crosscorrelation interference that is caused by the interaction between the multiplexed signals. The system transmits a lesser number of multiplexed orthogonal signals than would be required in the corresponding antipodal system, thereby reducing the crosscorrelation interference, while maintaining the same information throughput. The bit error rate of the system is reduced. The method combines aspects of unequal error protection (UEP) error correction coding (ECC) with a receiver architecture for biorthogonal signals. The system exhibits a signal-to-noise ratio (SNR) improvement in the detection of some fraction of the encoded digital data bits. This facilitates the use of additional error control redundancy in the remaining data bits, which results in an overall improvement in the decoded error rate performance.

16 Claims, 15 Drawing Sheets

Microfiche Appendix Included
(1 Microfiche, 84 Pages)

U.S. PATENT DOCUMENTS

| | | |
|---|---|---|
| 5,216,693 | 6/1993 | Nakamura . |
| 5,235,614 | 8/1993 | Bruckert et al. . |
| 5,278,844 | 1/1994 | Murphy et al. . |
| 5,282,019 | 1/1994 | Basile et al. . |
| 5,282,222 | 1/1994 | Fattouche et al. . |
| 5,305,352 | 4/1994 | Calderbank et al. . |
| 5,315,583 | 5/1994 | Murphy et al. . |
| 5,327,455 | 7/1994 | Degaudenzi et al. . |
| 5,327,496 | 7/1994 | Russell et al. . |
| 5,347,536 | 9/1994 | Meehan . |
| 5,371,760 | 12/1994 | Allen et al. . |
| 5,377,194 | 12/1994 | Calderbank . |
| 5,379,320 | 1/1995 | Fernandes et al. . |
| 5,390,207 | 2/1995 | Fenton et al. . |
| 5,412,620 | 5/1995 | Cafarella et al. . |
| 5,414,729 | 5/1995 | Fenton . |
| 5,425,050 | 6/1995 | Schreiber et al. . |
| 5,428,818 | 6/1995 | Meidan et al. . |
| 5,469,452 | 11/1995 | Zehavi ........................................ 371/43 |
| 5,546,420 | 8/1996 | Seshadri et al. ......................... 375/200 |
| 5,592,471 | 1/1997 | Briskman ............................... 455/52.3 |
| 5,615,227 | 3/1997 | Schumacher, Jr. et al. ............. 375/200 |

OTHER PUBLICATIONS

"Performance Analysis of a Multilevel Coded Modulation System", IEEE Transactions on Commumications, vol. 42, No. 2/3/4, pp. 299–312, Feb./Mar./Apr. 1994, by Y. Kofman, E. Zehavi, and S. Shamai.

"Highly Reliable Multilevel Channel Coding System Using Binary Convolutional Codes", Electronics Letters, vol. 23, No. 18, pp. 939–941, Aug. 1987, by K. Yamaguchi and H. Imai.

"Reed–Solomon Coding Performance with Errors and Erasures Decoding on a Rayleigh Fading Channel" by Paul J. Crepeau and Karen W. Halford, IEEE, Proceedings of Milcom '94, pp. 1023–1026, 1994.

*Modern Communications and Spread Spectrum,* by G.R. Cooper and C.D. McGillem, NY; McGraw–Hill, Inc., 1986, p. 215 and pp. 233–235.

"Trellis–Coded Direct–Sequence Spread–Spectrum Communications" by B. D. Woerner and W. E. Stark, IEEE Transactions on Communications, vol. 42, No. 12 pp. 3161–3170, Dec. 1994.

"COFDM: An Overview", by W. Y. Zou and Y. Wu, IEEE Transactions of Broadcasting, vol. 41, No. 1, pp. 1–8, Mar. 1995.

"Theory of Spread–Spectrum Communications—A Tutorial" by R. L. Pickholtz and D. L. Schilling and L. B. Milstein, IEEE Transactions and Communications, vol. 30, No. 5, pp. 855–884, May, 1982.

"Crosscorrelation Properties of Pseudorandom Sequences", by D.V. Sarwate and M.B. Pursley, Proceedings of the IEEE, vol. 68, No. 5, pp. 593–619, May 1980.

"An Efficient Channel Coding Scheme for Direct Sequence CDMA Systems", by S. L. Miller, Proceedings of Milcom '91, pp. 1249–1253, 1991.

"Recent Spreading Codes for Spread–Spectrum Communications Systems", by S. Tachikawa, Electronics and Communications in Japan, Part 1, vol. 75, No. 6, pp. 41–49, Jun. 1992.

"Convolutional Codes and Their Perfomance in Communications Systems", by A. J. Viterbi, IEEE Transactions and Communications, vol. 19, No. 5, pp. 751–722, Oct. 1971.

*Modern Quadrature Amplitude Modulation,* by W. T. Webb and L. Hanzo, London: Pentech Press, Ltd., 1994, pp. 266–268.

"A Performance Comparison of the Binary Quadratic Residue Codes with the 1/2–Rate Convolutional Codes", by X. Chen, I.S. Reed and T.K. Truong, IEEE Transactions on Information Theory, vol. 40, No. 1, pp. 126–136, Jan. 1994.

"Realization of Optimum Interleavers," by J. L. Ramsey, IEEE Transactions on Information Theory, vol. 16, No. 3, pp. 338–345, May 1970.

*Modern Communications and Spread Spectrum,* by G. R. Cooper and C. D. McGillem, NY: McGraw–Hill, Inc., 1986, p. 159, pp. 206–209, pp. 423–425.

*Introduction to Convolutional Codes with Applications,* by A. Dholakia, Dordrecht: Kluwer Acad. Pub., 1994, pp. 104–108.

"Bounds and Approximations for the BIT Error Probability of Convolutional Codes," by A.G. Burr, Electronics Letters, vol. 29, No. 14, 1287–1288, Jul. 1993.

"Robustly Optimal Rate One–Half Convolutional Codes," by R. Johannesson, IEEE Transactions on Information Theory, vol. 21, No. 4, pp. 464–468, Jul. 1975.

*Telecommunication Systems Engineering,* by W. C. Lindsey and M.K. Simon, Englewood Cliffs, NJ: Prentice Hall, Inc., 1973, pp. 188–194, p. 198, pp. 210–225, p. 253, pp. 266–269, pp. 272–277, pp. 235–240.

"ISO–MPEG–1 Audio: A Generic Standard for Coding of High–Quality Digital Audio" by K. Brandenburg and G. Stoll, Journal of the Audio Engineering Society, vol. 42, No. 10, pp. 780–792, Oct. 1994.

ISO/IEC 11172–1/2/3, "Information Technology—Coding of Moving Pictures and Associated Audio for Digital Storage Media at up to About 1/5 Mbit/s," Geneva, Switzerland, pp. 140–142, 1993.

"Short Convolutional Codes with Maximal Free Distance for Rates 1/2, 1/3 and 1/4," by K. L. Larsen, IEEE Transactions on Information Theory, vol. 19, No. 3, pp. 371–372, May 1973.

"New Short Constraint Length Convolutional Code Constructions for Selected Rational Rates," by D. G. Daut, J.W. Modestino, and L.D. Wismer, IEEE Transactions on Information Theory, vol. 28, No. 5, pp. 794–800, Sep. 1982.

"Constructions on Rate (n–1)/n Punctured Convolutional Codes with Minimum Required SNR Criterion," by P.J. Lee, IEEE Transactions on Communications, vol. 36, No. 10, pp. 1171–1174, Oct. 1988.

"New Rate–Compatible Punctured Convolutional Codes for Viterbi Decoding", L.H.C. Lee, IEEE Transactions on Communications, vol. 42, No. 12, pp. 3073–3079, Dec. 1994.

"Error Correction Capabilities of Binary Mapped Reed–Solomon Codes with Parity BITS Appended to all Symbols," by C.C. Hsu, I.S. Reed, and T.K. Truong, IEEE Proceedings—Communications, vol. 141, No. 4, pp. 209–211, Aug. 1994.

"Synthesis of Band–Limited Orthogonal Signals for Multichannel Data Transmission," by R.W. Chang, The Bell System Technical Journal, vol. 45, pp. 1775–1796, Dec. 1966.

SYSTEM AND METHOD FOR MULTIPLEXING A SPREAD SPECTRUM COMMUNICATION SYSTEM

This invention relates to a method and system for reducing the crosscorrelation interference caused by multipath propagation in a communication system with orthogonal digital signals. More particularly, this invention relates to a method and system which utilizes multiplexing of distinct and orthogonal digital signals which are determined by biorthogonal modulation, and unequal error protection to reduce interference caused by multipath propagation in a communication system (e.g. spread spectrum) to improve the decoded error rate compared to antipodal modulation. According to certain embodiments, simultaneous multiplexing of a plurality of distinct and orthogonal signals is provided.

CLAIM TO COPYRIGHT IN REFERENCE TO MICROFICHE APPENDIX

A portion of the disclosure of this patent application contains material which is subject to copyright protection. The copyright owner has no objection to the reproduction by anyone of the patent document as it appears in the Patent and Trademark Office files or records, but otherwise reserves all copyrights whatsoever. Software for carrying out some of the methods and systems described herein has been filed with the United States Patent and Trademark Office herewith in the form of a microfiche appendix including numerous frames, one of which being a title frame. The microfiche appendix includes one (1) microfiche and eighty-four (84) frames.

BACKGROUND OF THE INVENTION

Robust mobile digital communication is difficult to accomplish in view of the deleterious effects of the environment on the propagation characteristics of radio-frequency (RF) channels, for example. Atmospheric conditions and variations in terrain, foliage, and the distribution and density of man-made structures strongly affect the medium which such signals (e.g. RF) traverse. In satellite broadcast systems, the received propagation path is primarily line-of-sight, and adequate reception may be limited by the presence of background noise when the available field strength is insufficient. However, in terrestrial communication, for carrier frequencies less than about 8 gigahertz (GHz), multipath interference often causes system degradation or failure before the effects of simple additive noise become evident.

Multipath interference is caused by the simultaneous reception of multiple signal paths with varying delays, amplitudes, and phases. The paths correspond to diffuse and specular reflections of the transmitted signal, typically from objects situated between the transmitter and the receiver. The plurality of received signals, due to the different paths, sum together and cause constructive or destructive linear interference. The distortion resulting from multipath varies with changes in the position of the transmitter, receiver, and intervening objects.

Multipath is a frequency-selective phenomenon. The changes in the received signal amplitude, phase, and delay vary with frequency, which causes dispersion in the received signal. The rate of change of multipath distortion is in part determined by the relative difference in velocity between the transmitter and receiver. The composite multipath signal is usually comprised of the line-of-sight (LOS) signal component with minimum path delay and a plurality of echo signal components, with longer delays. However, in obstructed terrain, the LOS signal can be significantly attenuated or absent altogether. Although the number of possible signal propagation paths is innumerable except in the simplest terrain, only those paths whose received signal amplitudes are significant need to be considered in a digital communication systems (e.g. those paths within about 15 decibels of the largest amplitude path).

The delay spread is the approximate duration between the paths of significant amplitude with the minimum and maximum time-of-arrival at the receiver. A predetermined amount of bit information is transmitted in a specified interval of time by the transmitter system. This interval is known as the baud interval, and the RF signal transmitted is known as the symbol. Unless specific countermeasures are incorporated to combat multipath, the symbol rate throughput is bounded by approximately the reciprocal of the delay spread. The delay spread can exceed, for example, tens of microseconds in very high frequency (VHF) RF propagation in the circumstance of specular multipath, which restricts the symbol throughput to less than about 100 kHz.

In terrestrial broadcast systems, the transmitter site is fixed and a signal is transmitted to a plurality of receivers through atmospheric free-space. One known way in which to combat multipath is to use a directional antenna for fixed receivers, but this may be impractical in mobile environments which require omnidirectional reception.

Known diversity antenna systems use a plurality of antennas separated by a distance approximately equal to half of the carrier frequency wavelength. Diversity systems reduce the problem of insufficient field strength due to the destructive interference caused by multipath propagation. However, diversity systems typically do not compensate for dispersive effects. Furthermore, diversity antennas may be impractical in personal communication systems because of size requirements.

The effects of multipath propagation can also be mitigated by the design of a signal set and modulation. Orthogonal Frequency Division Multiplexing (OFDM) and spread spectrum are two methods that are currently used in environments where multipath is a problem. Both methods require that the communication system utilize the full available bandwidth for maximum effectiveness.

In free-space atmospheric propagation of high-power RF signals, for example, bandwidth restrictions are typically imposed by regulatory agencies such as the Federal Communications Commission (FCC) in the United States. The method of OFDM [reference: W. Y. Zou and Y. Wu, "COFDM: an overview," *IEEE Transactions on Broadcasting*, Vol. 41, No. 1, pp. 1–8, March 1995] uses a plurality of synchronized sinusoid-like narrowband signals, which together span the available bandwidth and are simultaneously transmitted. Each narrowband signal conveys a fraction of the total data (bit) rate throughput. The use of multiple narrowband signals permits the duration of a single information signal (i.e. symbol or baud) to be made long in duration compared to the expected delay spread, which minimizes the effects of intersymbol interference, because the simultaneous multiplexing decreases the required bit rate for each of the individual narrowband signals. In OFDM, each of the narrowband signals has the property of being orthogonal to all of the other multiplexed narrowband signals when properly synchronized. In principle, a sufficient number of the narrowband signals will be minimally affected because of the frequency-selective characteristics of multipath so that, with known error correction coding (ECC), the overall bit rate throughput is still reliable. However, multipath may still cause destructive interference to some of the narrowband signals in OFDM modulation so that they may not be received reliably.

Orthogonal signals in OFDM may be simultaneously transmitted and uniquely separated from each other in the receiver by the mathematical process of "correlation." The extent to which two signals are orthogonal is determined by the magnitude of their "crosscorrelation" function. The crosscorrelation value or sum is proportional to the summation of the multiplicative product of the two signals. Signals which are perfectly orthogonal have a crosscorrelation value of zero.

A fundamentally different method which combats the effects of multipath propagation is known as "spread spectrum" modulation [reference: R. L. Pickholtz, D. L. Schilling, and L. B. Milstein, "Theory of spread-spectrum communications—a tutorial, *IEEE Transactions on Communications*, Vol. 30, No. 5, pp. 855–884, May 1982]. See also U.S. Pat. Nos. 5,063,560; 5,081,643; 5,235,614; and 5,081,645.

In a spread spectrum communication system, the bandwidth occupied by the digital data message is expanded (spread) by multiplying the data message by a spreading signal or sequence. Since multipath is a frequency-selective phenomenon, if the bandwidth spreading is sufficiently large, only part of the spread signal will be deleteriously affected. The spreading process is reversed in the receiver in order to recover the original data message. The improvement in robustness brought about by such spreading is measured by the "processing gain" of the spread spectrum system, which is essentially the ratio of the spread signal bandwidth to that of the original data message. The processing gain is realized by the de-spreading process in the receiver. As the bandwidth of the spread message is collapsed by the process of correlation, the effects of multipath distortion are also mitigated.

Whereas the principle of OFDM modulation is to transmit many simultaneous narrowband signals so that only a small number of the signals are disturbed by multipath, the idea of spread spectrum is to disperse a single signal across the widest available bandwidth to minimize the fraction of the total signal energy which is susceptible to multipath. Spread spectrum modulation may also effective against many forms of frequency-selective interference other than multipath, including narrowband continuous-wave (CW) interference.

Unfortunately, a disadvantage of spread spectrum modulation is that if the available bandwidth is limited as in RF, the bit rate frequency (i.e. reciprocal of bit interval) of the data message must be a small fraction of the available bandwidth (e.g. less than about $1/10$) in order to ensure sufficient processing gain. Thus, a spread spectrum communication system with only one spreading signal exhibits relatively poor spectrum efficiency (e.g. less than about one (1) bit/symbol/Hz).

In order to improve the efficiency, multiple spread spectrum signals can be multiplexed and simultaneously transmitted. It is possible to simultaneously transmit multiple signals without synchronization among the signals, which is not possible with OFDM. This is known as the method of asynchronous "code-division multiple-access" (CDMA). It is advantageous in systems which must support multiple independent users, where synchronization is often impractical. However, spread spectrum communication systems with high spectrum efficiency (greater than about 1 bit/symbol/Hz) are generally only possible when the multiplexed orthogonal signals are synchronized.

In a synchronized spread spectrum system, it is known that multiple signals may be simultaneously transmitted and independently recovered so long as the spread signals are orthogonal to each other. This is similar to the method of OFDM. However, because each of the spread signals occupies the full available bandwidth, it is not possible to use conventional frequency-specific bandpass filtering or Fast-Fourier Transform (FFT) mathematical processing to separate the spread signals. Instead, the characteristics of each of the spreading signals (spreading codes) are constructed so that they may be separated from one another by the process of correlation. Since the spread signals are orthogonal, the crosscorrelation between any one of the spreading signals and those signal components of the composite, multiplexed signal which do not correspond to the spreading signal is approximately zero. Therefore, each of the orthogonal signals can be separated from the composite by correlating the composite signal with the appropriate spreading signal. This structure is known in signal processing literature as a bank-of-matched filters. The data-specific modulation which is impressed upon the spreading signal generally does not disturb the orthogonality property of the signals. Unfortunately, each of the above spread spectrum methods suffers in multipath environments as will be discussed below.

Spreading signals or codes can be determined by various methods. Because communication systems typically incorporate some amount of error correction capability, it is often not necessary for the spreading codes to be perfectly orthogonal. The crosscorrelation magnitude for approximately orthogonal (AO) signals is small but non-zero (e.g. $\approx 1/\sqrt{N}$ for Gold codes where N is the code length). AO signals are often used for spreading when the total crosscorrelation interference generated by the interaction among all of the signals is significantly smaller than the processing gain (e.g. smaller by at least about 15 decibels). In the absence of multipath, the performance of AO signals is inferior to perfectly orthogonal signals because of the finite crosscorrelation sum (known as the code-noise or self-noise). However, AO signals have the advantage that the crosscorrelation sums typically do not deteriorate as quickly when multipath is present because they do not require precise synchronization.

Some spreading signals or sequences which have been implemented in prior art spread spectrum systems include, but are not limited to, distinct m-sequences, which are also known as pseudonoise (PN) sequences or maximal-length sequences [reference: D. V. Sarwate and M. B. Pursley, "Crosscorrelation properties of pseudorandom sequences," *Proceedings of the IEEE*, Vol. 68, No. 5, pp. 593–619, May 1980], distinct phases of a single m-sequence [reference: S. L. Miller, "An efficient channel coding scheme for direct sequence CDMA systems," *Proceedings of MILCOM '91*, pp. 1249–1253, 1991], orthogonal m-sequences with bit stuffing as disclosed by Gutleber in U.S. Pat. No. 4,460,992, issued Jul. 17, 1984, Gold codes, Kasami codes, Hadamard codes, and Bent codes [reference: S. Tachikawa, "Recent spreading codes for spread spectrum communications systems," (translated) *Electronics and Communications* in Japan, Part 1, Vol. 75, No. 6, pp. 41–49, June 1992]. It is also possible to determine spreading sequences which occupy the available bandwidth and which are orthogonal using matrix eigenvector methods, such as disclosed in U.S. Pat. No. 4,403,331 by P. H. Halpern and P. E. Mallory, issued Sep. 6, 1983 or by using orthonormal wavelets as disclosed by Resnikoff, et al. in U.S. Pat. No. 5,081,645, issued Jan. 14, 1992. The above-listed spreading sequences or signals may be used in this invention, as discussed hereinafter.

A multiplexed spread spectrum system has a specified number, N, of simultaneously transmitted orthogonal signals. Each signal has "antipodal" (bipolar, binary phase-shift-keying or BPSK) data modulation, where the source data message bit determines the transmitted polarity of the spreading signal. "Antipodal" modulation conveys one information bit per baud per signal. Therefore, the overall bit rate of such multiplexed systems is N bits per baud. It is possible to increase the efficiency to 2N bits per baud by using both the in-phase and quadrature phases of the RF signal carrier. This is known as Quaternary Phase-Shift Keying or QPSK. A spread spectrum system with N signals and QPSK modulation is equivalent to a system with 2N signals and BPSK modulation, where signal pairs have a quadrature phase relationship. The information rate can be further increased by replacing the two-level BPSK modulation of he spreading signal with a plurality of distinct amplitude levels. This is known as m-ary amplitude modulation. A disadvantage of m-ary modulation is the increased sensitivity to noise.

Unfortunately, multipath significantly degrades the performance of such multiplexed spread spectrum systems. In a system with a single spread signal (N=1), multipath propagation causes various reflections or echoes of the LOS signal path to combine with varying amplitudes, phases, and delays. Thus, the signal becomes a source of interference to itself for all propagation paths with delays other than the one which is established by the process of synchronization as the reference path. This is usually the LOS path with the largest received signal strength. The correlation of a single signal with itself, expressed for varying delays, is defined as the autocorrelation function.

The amount of interference caused by an echo at a specific delay is determined by the magnitude of the autocorrelation function for the spread signal at that delay, weighted by the amplitude of the received echo path relative to the LOS path. If the processing gain is much larger (e.g. more than about 10 decibels) than the magnitude of the autocorrelation interference, the system will be robust against multipath.

However, in a multiplexed system (i.e. where N>1), the additional or other signals act as sources of interference. Multipath disturbs the orthogonality between signals and increases the magnitude of crosscorrelation interference. The signals may then no longer be perfectly orthogonal or even approximately orthogonal in the face of multipath. Whereas with a single signal, only that signal is a source of interference to itself, in a multiplexed system with N signals, each one of the signals may also be affected by all (N−1) of the remaining signals. Even when the crosscorrelation between any pair of signals is relatively small, the effective (N−1) amplification of the interference is a significant problem. For example, when the multiplexed signals are modeled as statistically independent and uncorrelated random processes, and the standard deviation of the crosscorrelation magnitude between a pair of signals is $1/\sqrt{M}$, the detected signal-to-noise ratio in severe multipath, where there are equal parts echo path and LOS path, is only approximately $M/(N \cdot \sqrt{M}) = \sqrt{M}/N$, which approaches zero decibels as N approaches M which significantly decreases the reliability of the demodulation. As a result, the number of multiplexed signals must be limited to a number much less than $\sqrt{M}$, which diminishes the potential bit rate throughput of the system. The problem of crosscorrelation interference is less severe (but still present) in OFDM systems because the signals are narrowband and occupy relatively distinct frequency regions. Even with completely random phases due to varying echo arrival times, the narrowband signals which are separated in carrier frequency by more than one frequency spacing ($1/\Delta T$ where $\Delta T$ is the baud interval) retain most of their orthogonality properties.

It is known that crosscorrelation interference can be reduced by the use of an adaptive digital equalizer in the receiver as shown in prior art FIG. 2, for example. The equalizer attenuates the effects of the signal path echoes by either subtracting out the signal contributions of the echoes directly from the received signal (usually performed at the intermediate frequency) or by removing the effects of the echoes from the metric which is used in the bit determination (i.e. decision-feedback equalization). However, digital equalizers may require significant amounts of hardware to implement. The required update rate for the equalizer coefficients can be very fast, typically kilohertz rates for VHF carrier frequencies and automobile velocities. Because multipath conditions rapidly change in the land mobile environment, it is difficult to implement an equalizer which can completely compensate for the effects of multipath in all conditions and all instances. Therefore, even with an equalizer, there may be a residual level of multipath interference.

Error correction coding (ECC) is also known to be used to combat multipath in communication systems. This is a method that does not diminish the effective distortion. Instead, large amounts of coding redundancy are used to increase the reliability of the bit information so that the system is tolerant of large amounts of interference, and consequently high bit error rates. Unfortunately, the implementation cost of the redundancy is additional overhead in the bit rate throughput, which reduces the available bit rate for the data message. The overhead is expressed as the "code rate," which is the average ratio between the data message size in bits and the encoded (i.e. including redundancy) message size. As the redundancy is increased, the code rate diminishes towards zero. A communication system with ECC exhibits coding gain when compared to a system without ECC or with an inferior ECC system. coding gain is a characteristic, similar to processing gain, which expresses the improvement in performance brought about by redundancy after decoding the ECC code. It may be interpreted as an effective improvement in the signal-to-noise ratio present in the equivalent demodulation method without ECC. Because the conditions for continuous mobile reception are difficult and require high coding gains, practical code rates for communication systems are usually about one-half or less, which is equivalent to one hundred percent (100%) redundancy.

There is considerable prior art in the multiplexing and/or modulation of orthogonal signals. Two types of conventional modulation are known as "antipodal" and "biorthogonal" modulation respectively. FIG. 1 illustrates functional blocks of a prior art system for the transmission of multiplexed orthogonal digital signals with "antipodal" modulation (either spread spectrum or narrowband). Source bit information (message) 1 is randomized by scrambler 2, which multiplies binary message 1 by a scrambling polynomial such as that specified by the CCITT V.29 specification [reference: W. T. Webb and L. Hanzo, *Modern Quadrature Amplitude Modulation*, London: Pentech Press, Ltd., 1994, pp. 266–268]. The coefficients of the binary polynomial are selected to cause the elimination of long runs of consecutive binary ones or zeros and to cause the resulting binary message to have approximately equal probabilities for binary digits zero (0) and one (1). The polynomials are typically m-sequences, but this is unrelated to the possible use of m-sequences as spreading signals.

Scrambling function 2 is important because the source message may not be random. A non-random message biases the error statistics and can diminish the effectiveness of the ECC. Furthermore, many synchronization and equalization algorithms require approximately random data for proper operation. The scrambling method establishes a bijection between the source message and scrambled source message which may be uniquely inverted in the receiver.

Redundancy is added to the scrambled source message by error correction code (ECC) encoder 3. The resulting sequence of bits leaving encoder 3 is the encoded message. The optimum error correction encoder depends upon the expected characteristics of the error distribution, which requires knowledge of the specific modulation method and the expected RF channel impairments. Convolutional codes [reference: A. J. Viterbi, "Convolutional codes and their performance in communication systems," *IEEE Transactions on Communications*, Vol. 19, No. 5, pp. 751–772, October 1971] have been found to be optimum in circumstances where the error rate is substantially random, uncorrelated, and resembles a normal or Gaussian distribution. However, in bursty error environments, block codes may be used (e.g. binary BCH codes, Reed-Solomon codes, concatenated parity-Reed-Solomon codes, and quadratic residue codes) [reference: X. Chen, I. S. Reed, and T. K. Truong, "A performance comparison of the binary quadratic residue codes with the ½-rate convolutional codes," *IEEE Transactions on Information Theory*, Vol. 40, No. 1, pp. 126–136, January 1994. In encoder 3, the length of the encoded source message is increased by a factor which is the reciprocal of the encoder code rate compared to the scrambled source message.

The error encoded message is re-ordered by interleaver 4. Interleaving is a method of time diversity and is important in RF environments, for example, where burst errors are prevalent due to signal fading, such as in land mobile communication. Interleaver 4 disperses the encoded message so that consecutive encoded bits become separated by a sufficient time interval to eliminate probable correlation between errors. The interval is typically chosen as the amount of time required to traverse a distance which corresponds to several wavelengths of, for example, the RF carrier frequency at a medium vehicle velocity (e.g. 30 miles/hour). Interleaver 4 is implemented with random-access memory (RAM) and a shuffling algorithm which is used to address the RAM. A typical shuffling algorithm is the convolutional interleaver algorithm [reference: J. L. Ramsey, "Realization of optimum interleavers," *IEEE Transactions on Information Theory*, Vol. 16, No. 3, pp. 338–345, May 1970], which is unrelated to convolutional error coding. The interleaving process is reversed in the receiver by deinterleaver 20 in order to recover the original encoded bit sequence.

The encoded and interleaved message is divided into groups of bits, which are to be simultaneously transmitted in a single information symbol or baud, by serial-to-parallel converter 5. The bit width at the output of converter 5, designated N, corresponds to the number of orthogonal signals that is simultaneously transmitted from the FIG. 1 transmitter in this antipodal system. Each orthogonal spreading signal in the plurality of multiplexed signals is generated by a corresponding signal generator 6. Each signal generator 6 is implemented with a RAM or read-only memory (ROM) look-up table for arbitrary signals or tapped linear shift feedback registers (LSFR) for m-sequences. OFDM-like signals, for example, can be generated by an Inverse Fast Fourier Transform (FFT) algorithm. Each generated signal is distinct across all signal groups.

The characteristics of each signal generator 6 in the antipodal system determine whether or not the system is characterized as being narrowband or spread spectrum. Whether the FIG. 1 system is a spread spectrum or narrowband (e.g. OFDM) system is determined by the output of signal generator 6. For antipodal data modulation, each of the encoded bits determines the polarity of the corresponding orthogonal signal for the duration of the signal baud. Modulation of the signal polarity is performed by multiplying 7 the operated signal by either a positive or negative factor of unity, as determined by the switch, which is represented as polarity multiplexor (MUX) 8. MUX 8 is a switch which propagates only one of a plurality of inputs according to one of a plurality of control bits. In each multiplexor 8, the controlling input bit(s) is labeled "S" to distinguish it from the data inputs.

A composite digital signal is formed by the summation at 9 of the polarity-modulated orthogonal signals from each multiplier 7. In many such FIG. 1 systems, the preceding processes are typically implemented with digital circuits as shown. Prior to transmission, the signal is converted from the digital representation to an analog representation by digital-to-analog converter (DAC) 10. The composite signal is then amplified and translated to the RF carrier frequency to be propagated in free-space by RF up-converter 11. Up-converter 11 typically includes a mixer, a sinusoidal carrier frequency source or local oscillator (LO), a bandpass filter to limit noise and to eliminate the image-frequency generated by the mixer and other spurious frequency artifacts, and a tuned power-amplifier and transmitter antenna system to generate high-power RF signals. A linear combiner 9 is used to combine or sum the orthogonal signals when they are in analog form, while a summer or adder 9 may be used for combining or forming the composite signal in digital environments. A block diagram of a corresponding prior art antipodal receiver system with orthogonal multiplexing is shown in FIG. 2. Again, the FIG. 2 receiver may receive either narrowband or spread spectrum multiplexed orthogonal signals, depending upon the output of generators 18. The received RF signal is first amplified and filtered with a bandpass filter in tuner 12 to remove interference and noise which is outside of the bandwidth of the composite of orthogonal signals. The RF signal is typically frequency-translated to a lower frequency, known as the intermediate frequency (IF), for further processing, which simplifies the implementation. In some digital systems, the IF frequency is zero, which requires that the remaining processes be implemented with complex (i.e. real and imaginary components) digital arithmetic. These combined RF functions are abbreviated as RF tuner 12.

In many conventional FIG. 2 systems, the signal is converted from an analog representation to a digital representation by analog-to-digital converter (ADC) 13. The received signal is made synchronous with the transmitter in baud frequency and carrier frequency by baud clock recovery 14 and carrier frequency recovery 15 subsystems. Typically, these functional blocks are implemented with early/late or pulse-swallowing algorithms, phase-locked loops (PLLs), and/or frequency-locked loops (FLLs). The overall function of recoveries 14 and 15 is to eliminate frequency offsets caused by variation in components and the effect of Doppler frequency shift. The synchronization also establishes the proper timing so that the magnitude of the crosscorrelation between the multiplexed orthogonal signals will be at a minimum at an instance in the baud interval known as the sampling point.

The digitized signal is optionally equalized 16 in some prior art systems as discussed above in order to attempt to mitigate some of the effects of multipath. Equalizer 16 may be implemented with a finite impulse response (FIR) transversal filter (tapped delay line). The coefficients of the equalization filter are computed by a tap-weight update algorithm. The number of coefficients is determined so that the time interval spanned by equalizer 16 is at least as large as the expected multipath delay spread. In the VHF RF channel, the equalizer 16 extent is typically more than about ten (10) microseconds and less than about fifty (50) microseconds. There are various methods for updating the tap weight coefficients in the equalization filter, including, but not limited to, least mean square (LMS), recursive least squares (RLS), and Levinson-Durbin algorithms, all of which are known.

The equalized signal is applied to a plurality of correlators 17. The function of each correlator 17 is to compute the correlation sum between the received signal and one of the reference orthogonal signals 18 by summing the pairwise product of the two signals. Since the proper timing has been established by synchronization circuits 14, 15 and equalizer 16, it is only necessary to compute the correlation sum at the nominal sampling point for each orthogonal signal. Without proper synchronization, it would be necessary to compute the correlation sums for each orthogonal signal corresponding to various delays and then determine the maximum, which increases the receiver complexity significantly.

The orthogonal reference signals 18 of the receiver are identical to those in the transmitter (6 in FIG. 1). These orthogonal reference signals (either spread spectrum or narrowband) are generated in the receiver by a plurality of signal generators 18, one generator 18 corresponding to each correlator 17. The correlation sums determined by correlators 17 at the sampling point are reorganized as a serial sequence of sums by parallel-to-serial converter 19. For soft-decision maximum likelihood (ML or Viterbi) decoding of convolutional error codes, approximately three bits of quantization information is preserved for each correlation sum. For hard-decision decoding of ECC codes, only one bit of the correlation sum is preserved for each correlation sum. The sequence of correlation sums is the received code sequence prior to decoding.

For the method of OFDM, the correlators and signal generators in the receiver are typically implemented in parallel with the Fast Fourier Transform (FFT) mathematical algorithm.

The additional bits of quantization information, beyond the sign bit, for each of the correlation sums provides reliability information that can be used to improve the performance of the Viterbi soft-decision decoder. The bits determine an approximate measure of the distance between the correlation sum and the zero value. The zero value is typically the decision-switching threshold between the two possible polarity values for antipodal modulation. In principle, as the distance between the correlation sum and the zero value increases, the reliability of the polarity estimate also improves. Unfortunately, if the amplitude of the received signal fluctuates widely and is not sufficiently compensated for, then the magnitude of the distance between the correlation sums and the zero value also varies widely. This significantly diminishes the utility of the additional reliability bits since it may not be possible to determine if the variation in distance is due to uncompensated gain change or an increase in the amount of noise present in the correlation sum.

The shuffling effect of interleaver 4 in the FIG. 1 transmitter is reversed by deinterleaver 20 in the receiver. Although the time interval represented by the memory size of deinterleaver 20 in the receiver is the same as interleaver 4 in the transmitter, the implementation of deinterleaver 20 typically requires more RAM than the corresponding interleaver because of the importance of preserving reliability information associated with the correlation sums.

After deinterleaving 20, the code sequence is decoded by error correction code decoder 21 to determine the estimate of the scrambled source message. The ECC decoder reverses the effects of the ECC encoder according to the error correction code, substantially reducing the number of bit errors after decoding. The size of the decoded message is made smaller than the message prior to decoding by an amount corresponding to the code rate factor. The decoded message is unscrambled by descrambler 22, which reverses the bijection established by the scrambling in the transmitter, the resulting message 23 is substantially similar to the original source message 1 except for the occurrence of bit errors.

When the data modulation impressed upon the multiplexed orthogonal signals is antipodal (i.e. signal polarity), the bit error probability or rate, $P_b$, in the presence of additive white Gaussian noise (AWGN) is determined by the following equation [reference: G. R. Cooper and C. D. McGillem, *Modern Communications and Spread Spectrum*, New York: McGraw-Hill, Inc., 1986, pp. 159]:

$$P_b = Q\left(\sqrt{\frac{2 \cdot E_s}{N_{b0}}}\right) \quad (1)$$

where $E_s$ is the energy in any one of the orthogonal signals, which are assumed to be equiprobable and equal in energy, $N_{b0}$ is the noise spectral density, and Q is the complementary cumulative distribution function for the Gaussian probability density function (a.k.a. the Marcum Q function) [reference: G. R. Cooper, et al, ibid., pp. 423–425]. The noise spectral density is determined by measuring only the noise power through the bandwidth of the orthogonal signal. Generally, the total transmitter power is divided equally among the modulated orthogonal signals. The process of antipodal data modulation does not change the signal energy; only the polarity of the resulting correlation sum computed in the receiver is affected.

An exemplary distribution of the correlation sum for the received signal for any one of the antipodal signals in the prior art multiplexed system (FIGS. 1–2) with additive white Gaussian noise is shown as a graph in prior art FIG. 3. The abscissa values correspond to the possible correlation sum values except they are normalized by the signal energy $E_s$. In the absence of noise, the distributions would be replaced with two point masses, centered at minus one (−1) and plus one (+1), respectively, since there are two possible polarity values. As the result of noise, the point masses are smeared out into continuous distributions. The combined effects of noise and the antipodal modulation result in two regions 24 and 25, which correspond to negative polarity modulation (arbitrarily, encoded bit value 0) and positive polarity modulation (arbitrarily, encoded bit value 1). As a result of the assumption of Gaussian noise impairment, the distribution of the two regions intersect, which is shown as shaded region 26. Bit errors occur when the correlation sum values are distributed in shaded region 26.

The error probability $P_b$, determined in equation (1), is the area of intersection weighted by the a priori bit probabilities. A significant factor in determining the error rate $P_b$ is the Euclidean distance 27 between the mean abscissa values of the indicated regions. For antipodal modulation, this distance is 2 $E_s$ taking into consideration the normalization of the abscissa values shown in FIG. 3. This distance is represented in the numerator of the radical fraction in equation (1). The use of error correction coding increases the effective distance by the amount of the coding gain. Although the gain is only realized after the complete ECC decoding process is performed, the gain can be interpreted as if there had been an improvement in the distance prior to decoding. According to the first-error-event approximation [reference: A. Dholakia, *Introduction to Convolutional Codes with Applications*. Dordrecht: Kluwer Academic Publishers, 1994, pp. 104–108], the error probability after decoding, $P^D_b$ may be approximated for small error rates ($P^D_b < 1 \times 10^{-3}$) as:

$$P_b^D \approx Q\left(\sqrt{\frac{2 \cdot E_s \cdot d_{\mathit{eff}}}{N_{b0}}}\right) \quad (2)$$

where Q, $E_s$, and $N_{b0}$ are as in equation (1). $d_{\mathit{eff}}$ is the multiplying factor corresponding to the increase in distance due to the ECC coding gain. The accuracy of equation (2) degrades as the error rate increases towards $1 \times 10^{-1}$. Tabulated approximations such as those determined by Burr are required for higher error rates ($P^D_b > 1 \times 10^{-3}$) [reference: A. G. Burr, "Bounds and approximations for the bit error probability of convolutional codes," *Electronics Letters*, Vol. 29, No. 14, pp. 1287–1288, July 1993]. Equation (2) is an approximation and does not take into consideration the effects of the ECC code's specific distance profile.

A commonly used ECC code in mobile communication systems is the nonsystematic convolutional code with code rate ½ and an input constraint length, designated K, of seven (7) [reference: R. Johannesson, "Robustly optimal rate one-half binary convolutional codes," *IEEE Transactions on Information Theory*, Vol. 21, No. 4, pp. 464–468, July 1975]. For this code, having binary generating polynomials 634 and 564, $d_{\mathit{eff}}$, known as the free distance, is 10. The Q function is monotonic and rapidly decreases as its argument is increased so that use of the code results in a substantial improvement in decoded error performance. Larger constraint lengths (K values) improve the distance even further but at the cost of a significant increase in the complexity of the ECC decoder in the receiver, which is proportional to $2^{(K-1)}$ for Viterbi decoding. The ratio $E_s/N_{b0}$ in equation (2) is the signal-to-noise ratio (SNR) at the detection of any one of the antipodal modulated signals in the multiplexed composite. When multipath propagation or other dispersion is present, the apparent noise term increases well above that due to background noise and interference, and thermal noise, often dramatically. Severe multipath can occur even when the receiver is in close physical proximity to the transmitter and there is ample signal strength. As the SNR approaches zero decibels, where there are equal parts signal and interference, the effective coding gain contribution of the ECC diminishes. Therefore, it is advantageous to reduce the error rate prior to decoding, even when powerful, low-rate codes are implemented.

The crosscorrelation interference among multiplexed orthogonal signals disturbed by multipath is, in general, proportional to the number of signals. The interference sources can be modeled as combining coherently or incoherently, depending upon whether or not the characteristics of the multipath are specular or diffusive, respectively. The crosscorrelation interference can thus be mitigated by reducing the number of orthogonal signals that are simultaneously transmitted (i.e. summed in the composite).

A modulation method which can be used in order to reduce the number of simultaneously transmitted signals without reducing the bit rate throughput is known as biorthogonal modulation [reference: W. C. Lindsey and M. K. Simon, *Telecommunication Systems Engineering*. Englewood Cliffs, N.J.: Prentice-Hall, Inc., 1973, p. 198, pp. 210–225]. The essential difference between antipodal modulation (spread spectrum or narrowband), previously described, and biorthogonal modulation is illustrated in FIGS. 4 and 5, respectively, for an exemplary transmitter system with two generated orthogonal signals. In the transmitter system with antipodal data modulation, shown in prior art FIG. 4, two information bits are conveyed from the transmitter to the receiver by controlling the polarities of the two different orthogonal signals that are simultaneously transmitted, designated signals 28 and 29, respectively. After multiplying 7 signals 28 and 29 for polarity purposes, they are summed at 9 to form a composite. Each orthogonal signal conveys a single bit by the determination of its polarity with respect to an arbitrary reference polarity. The information bit is recovered in the receiver (see FIG. 2) by determining the polarity of the correlation sum between the received composite signal and the reference orthogonal signal; arbitrarily, positive polarity for bit value one (1) and negative polarity for bit value (0), as discussed above.

In a transmitter system for biorthogonal modulation, however, shown in prior art FIG. 5, only one of two orthogonal signals (either signal 31 or signal 32) is transmitted in each baud interval. Thus, the FIG. 5 system transmits only one of the two orthogonal signals to the receiver. The one orthogonal signal which is transmitted for the duration of the baud in biorthogonal modulation conveys two information bits. In prior art FIG. 5, one information bit is conveyed by the selection between which of the two orthogonal signals (31 and 32) is transmitted for the duration of the baud. The selection process is implemented with signal multiplexor 33. Those bits in the encoded source message which are associated with the control of the signal selection are labeled as selection bit information 34.

For example, the transmission of signal 31 in a baud can correspond to an encoded bit value of one (1) and, similarly, the transmission of signal 32 (instead of signal 31) to the encoded bit value of zero (0). The remaining information bit is conveyed by modulating the polarity of the signal to be sent. Polarity modulation is implemented by multiplying 7 both of the possible orthogonal signals 31 and 32 prior to selection multiplexor 33 by the factor of positive or negative unity using each polarity MUX 43, as shown in FIG. 5, or, equivalently, by multiplying the signal after selection multiplexor 33 (not shown). The polarity of the transmitted signal (either 31 or 32) is determined by those encoded message bits in the source message which have been associated with polarity bit information 35. Together, the functional blocks in FIG. 5 illustrate a conventional biorthogonal modulator where there are two possible distinct orthogonal signals 31 and 32 (only one of which is sent). The encoded message bits are divided among selection bits 34 and polarity bits 35.

With biorthogonal modulation, the characteristics of the transmitted signal are determined by both polarity and selection bit information. In the receiver, the determination of the polarity bit is related to the determination of the selection bit. Consequently, the selection and polarity bit error rates are coupled because the probability of error of the polarity bits depends on that of the selection bits. The coupling mechanism between the determination of the selection and polarity bits in a prior art receiver for biorthogonal modulation is illustrated in prior art FIG. 6, which is a block diagram of the relevant part of the receiver system for the demodulation of the biorthogonally modulated signal shown in FIG. 5, corresponding to transmission of one of two orthogonal signals, [reference: W. C. Lindsey and M. K. Simon, *Telecommunication Systems Engineering*, ibid.]. The received signal 54, having been tuned, synchronized and equalized as in FIG. 2, is correlated 17 with the two possible orthogonal signals, 55 and 56, for the exemplary group, which correspond to transmitter signals 31 and 32 respectively in FIG. 5. The magnitudes of the two resulting correlation sums are computed by absolute value functions 57 and 58. A comparison of the absolute values is made by comparator 59, which determines the demodulated selection bit 60 by selecting the signal with the larger correlation sum magnitude. Simultaneously, the polarities of the two correlation sums are determined by limiters 61 and 62. A limiter preserves only the sign information (arbitrarily, binary one for positive polarity and binary zero for negative polarity, randomly zero or one for exactly zero). The result of the comparison in 59 is a binary value. The value controls multiplexor 63, which determines which of the two polarity values, determined by the limiters, is propagated as the demodulated polarity bit 64. The polarity bit information which corresponds to the signal with the largest correlation sum magnitude is selected. The orthogonal signal with the largest correlation magnitude is determined to have been the most likely signal transmitted. The determined polarity and selection bits are propagated to the next subsystem, which is parallel-to-serial converter 19, as in FIG. 2, to be deinterleaved and ECC decoded. Thus, in prior art biorthogonal demodulation, the selection bit estimate is determined and utilized in the determination of the relevant polarity bit estimate, both functions being accomplished in the demodulator.

Prior art FIG. 7 illustrates an exemplary distribution of the possible correlation sum values for the biorthogonal receiver of FIG. 6 with one of two possible orthogonal signals transmitted in the presence of additive white Gaussian noise. The distribution of FIG. 7 is representative of the signal exiting correlators 17 in prior art FIG. 6. Since the signals are equiprobable and possess equal energy, it is sufficient to consider the possible correlation sums in the event of the transmission of only one of the signals for all baud intervals and with a fixed arbitrarily positive polarity. The abscissa values are normalized as in FIG. 3. In the absence of noise, there would be two point masses, centered at zero (0) and positive two (+2), respectively. The presence of noise smears the point masses out into continuous distributions. Distribution region 45 illustrates the correlation between the received signal and the orthogonal signal which corresponds to the correct selection bit. The mean abscissa value for the region is two (2), not one (1) as in FIG. 3 for antipodal signals, because only one of the two orthogonal signals was transmitted with biorthogonal modulation. Thus, for a fixed composite signal transmitter power, each of the two possible signals with biorthogonal modulation can possess twice the signal energy compared to the individual signals of antipodal modulation where both orthogonal signals are transmitted.

Distribution region 46 in FIG. 7 represents the correlation between the received signal and the other orthogonal signal in the group (i.e. corresponding to the incorrect determination of the selection bit). The mean abscissa value of region 46 is zero, not minus one (−1) as in FIG. 3 for antipodal signals, because the two signals are orthogonal (i.e. zero crosscorrelation). Since the detection method for biorthogonal modulation is a comparison of correlation sum magnitudes, errors occur in overlapping region 47.

However, biorthogonal system errors also occur in regions 48 and 49 which correspond to the images of the overlapping region 47 for the opposite polarity. These additional error events occur in conventional biorthogonal systems (FIGS. 5–7) because the correlation sum polarity information cannot be used to determine which of the two signals was most likely to have been transmitted. Instead, the polarity of the correlation sum is used to determine the remaining information bit, the polarity bit. In comparison to FIG. 3, the combined area of the regions where errors occur for conventional biorthogonal modulation (FIG. 7) is twice that of the antipodal system (FIG. 3). The mean abscissa values of regions 46 and 45 in FIG. 7 are separated by Euclidean distance 50, which is equivalent to the distance for antipodal modulation.

Prior to consideration of the ECC decoding, the probability of error in the determination of the selection bits for biorthogonal modulation (FIGS. 5–7) signals, $P^S_b$, is:

$$P_b^S = 2 \cdot Q\left(\sqrt{\frac{2 \cdot E_s}{N_{b0}}}\right) \tag{3}$$

which is exactly twice the antipodal error probability given by equation (1). The probability of error for the polarity bits in prior art FIGS. 5–7 is more complicated and depends upon the probability of error for the selection bits. If the selection bit is correctly identified, which occurs with probability $(1-P^S_b)$, the conditional polarity bit error probability, $P^{P|S}_b$ is:

$$P_b^{P|S} = Q\left(\sqrt{\frac{2 \cdot 2 \cdot E_s}{N_{b0}}}\right) \tag{4A}$$

Once the correct orthogonal signal is identified by the determination of the selection bits without error, the demodulation of the polarity bit is similar to antipodal demodulation. The antipodal error probability is often abbreviated as:

$$P_b = Q = \left(\sqrt{\frac{2 \cdot E_s}{N_{b0}}}\right) = Q(\sqrt{SNR}) \tag{4B}$$

where SNR is the detection signal-to-noise ratio. Therefore, the polarity bit conditional error probability for biorthogonal modulation exhibits a three (3) decibel (i.e. factor of two in power) advantage in SNR when compared to antipodal signaling. The reason for the polarity bit advantage in SNR with biorthogonal modulation is that the transmitted signal, representing only one of the two orthogonal signals, has twice the signal energy of the antipodal system for the same level of noise.

Prior art FIG. 8 illustrates the improvement in the Euclidean distance 51 between the mean abscissa values of the regions 52 and 53 compared to the distance 27 in FIG. 3 for the distribution of the correlation sums for the two possible transmitted polarity values when the selection bit is correctly demodulated.

However, when the selection bit is incorrectly identified in the biorthogonal demodulator, which happens with probability $P^S_b$, the conditional probability of error for the polarity bit is one-half (½) because the polarity of the correlation sum corresponding to the incorrect signal is unrelated to the correlation sum of the correct signal. The polarity determination is then essentially random; in other words, a coin toss. The overall error probability for the polarity bits, $P^P_b$, is the weighted sum of the two conditional error probabilities:

$$P^P_b = P^S_b \cdot \tfrac{1}{2} + (1 - P^S_b) \cdot P^{P|S}_b \qquad (5)$$

By inspection of equation (5), even under the idealistic assumption that the conditional probability of error in determining the polarity bits, $P^{P|S}_b$, is zero (i.e. no errors which would require infinite SNR), the overall polarity bit error rate would be only half that of the selection bit error rate, $P^S_b$. Since the selection bit error rate was shown in equation (3) to be twice that of the antipodal system with equivalent throughput, the overall polarity bit error rate can, at best, approach the antipodal error rate as the SNR becomes infinite. The biorthogonal selection bit error rate is then inferior to the bit error rate of the antipodal system, assuming the same ECC coding. Therefore, the overall error performance of prior art biorthogonal modulation (FIGS. 5–8) is inferior to antipodal modulation (FIGS. 1–4) for a specified SNR. The method of biorthogonal modulation has the advantage of decreasing the crosscorrelation interference by reducing the number of simultaneously transmitted signals. This lowers the effective noise variance in the biorthogonal system when compared to the antipodal system in multipath. Unfortunately, however, any advantage brought about by the use of biorthogonal modulation compared to antipodal modulation is greatly diminished by the strong dependence of the polarity bit error probability on the selection bit error probability. An object of this invention is to weaken this dependence through the use of ECC coding gain.

U.S. Pat. No. 4,247,943 to Malm discloses the use of orthogonal or biorthogonal codewords in a receiver system for a signal that is generated by frequency-shift keying together with local phase-shift-keying. The receiver makes use of crosscorrelation sums determined between the received signal and four orthogonal signals, corresponding to the in-phase and quadrature components at two frequencies, to demodulate the signal.

Biorthogonal codewords [reference: W. C. Lindsey and M. K. Simon, *Telecommunication Systems Engineering*, ibid., pp. 188–194] are sets of binary sequences (i.e. ones and zeros) which are constructed so that the permissible codewords are either pairwise orthogonal or complementary to each other. Biorthogonal codes are typically used to phase-modulate a narrowband sinusoidal signal. The use of biorthogonal codes is unrelated to biorthogonal modulation across a plurality of orthogonal signals and hence is also unrelated to the instant invention.

U.S. Pat. No. 4,730,344 to Saha discloses a four dimensional modulation method known as Quadrature-Quadrature Phase-Shift Keying (QQPSK). The system of the '344 patent makes use of the in-phase and quadrature components of a signal with further data shaping of each component according to two orthogonal pulse shapes. This corresponds to the prior art system of FIGS. 1 and 2 with four simultaneously multiplexed orthogonal signals with antipodal modulation.

U.S. Pat. No. 4,587,662 to Langewellpott discloses a time-multiplexed receiver system wherein the correlator sampling point is controlled dynamically so as to take advantage of the multiple correlation peaks present in a received signal which is subject to multipath propagation. The system of '662 allows for coherent signal reception which permits the use of biorthogonal binary phase codewords in the corresponding transmitter. The demodulation of biorthogonal codewords is not novel and is thus unrelated to the instant invention.

U.S. Pat. No. 4,700,363 to Tomlinson et al discloses a method of m-ary phase modulation and unequal error protection whereby those bits corresponding to a lessor difference among permitted phase states, being less reliable in the presence of noise, are afforded additional error correcting code redundancy. In the receiver system, after error decoding, these bits are subtracted from the base signal in order to demodulate the remaining bits. The system of '363 uses m-ary phase-shift keying together with the possible use of biorthogonal binary phase codewords. As previously discussed, this is unrelated to biorthogonal modulation.

U.S. Pat. No. 5,305,352 to Calderbank et al discloses a single narrowband carrier Quadrature Amplitude Modulation (QAM) system with unequal error protection. The method partitions the possible modulation states across the in-phase (I) and quadrature (Q) components to form sets which maximize the Euclidean distance determined across multiple information symbols. This technique is known as trellis-coded modulation (TCM). The system of '352 extends prior art TCM by the definition of further classes which correspond to data of varying importance. High importance data is associated with "supersymbols" which are afforded additional error correction code redundancy. The decoded supersymbols are used in the determination of the remaining sets of the phase states. The system of '352 uses prior art amplitude/phase-shift keying and is unrelated to the method of biorthogonal modulation with or without multiplexing. Generalized amplitude and phase-shift keying is not applicable to multiplexed spread spectrum because the data modulation disturbs the orthogonality property. As with prior art unequal error protection system, the consequence of affording additional protection to some bits is to cause a reduction in the reliability of the remaining bits. A goal of the instant invention is to allow unequal error protection without a degradation in performance of any of the bits when compared to antipodal modulation. The system '352 also omits the important function of interleaving, the incorporation of which would require modification of the modulation described, and may not be suitable for mobile communication.

U.S. Pat. No. 5,214,656 to Chung et al and U.S. Pat. No. 5,377,194 to Calderbank disclose methods of TCM modulation together with unequal error protection and time-multiplexing so that separate phase constellations can be associated with high importance data and lower importance data. The phase constellation for the high importance data is generated to be less susceptible to the effects of noise compared to that for the lower importance data thereby resulting in unequal error protection. This is unrelated to the method of unequal error coding whereby different error correction codes are applied to the high and low importance bits. Both systems described in the '656 and '194 patents utilize prior art QAM modulation and are unrelated to the method of biorthogonal modulation. A disadvantage of these systems is that the available time-bandwidth product is halved by the partitioning of the baud into disjoint intervals.

Modulation methods which make use of orthogonal or biorthogonal groups of signals are disclosed by Yerbury et al in U.S. Pat. No. 5,063,560, by Bruckert et al in U.S. Pat. No. 5,235,614, by B. D. Woerner and W. E. Stark in "Trellis-coded direct-sequence spread-spectrum communications," *IEEE Transactions on Communications*, Vol. 42, No. 12, pp. 3161–3170, December 1994, and by S. L. Miller in "An efficient channel coding scheme for direct sequence CDMA systems," *Proceedings of MILCOM '91*, pp. 1249–1253, 1991, for use in spread spectrum systems for "multiple-access." In a multiple-access system, each orthogonal or biorthogonal signal group corresponds to a distinct, independent user. The purpose of multiplexing is to increase the number of users that can share the RF channel by simultaneously transmitting and receiving signals. If there are N simultaneous users and each user's biorthogonal group of signals conveys $\log_2 M+1$ bits, then the overall throughput of the channel, including all users, is $N \cdot (\log_2 M+1)$. However, the throughput for each user's transmitter and receiver is $\log_2 M+1$ bits. Whereas the goal of multiple-access is to maximize the number of simultaneously transmitted signals, and consequently users, the goal of the instant invention is to reduce the number of simultaneously transmitted signals in order to decrease the crosscorrelation interference while maintaining the same information throughput. The transmitter and receiver system of the invention have a throughput equal to the overall channel throughput.

Accordingly, it is apparent from the above that there exists a need in the art for: (i) limiting or diminishing the coupling between the selection and polarity error probabilities in biorthogonal modulation; (ii) mitigating or reducing the crosscorrelation interference caused by the interaction between multiplexed signals; (iii) reducing the decoded bit error rate in biorthogonal modulation as compared to antipodal modulation in the face of additive Gaussian noise and multipath; and (iv) providing a communication system (e.g. RF spread spectrum) which is markedly improved with respect to multipath.

SUMMARY OF THE INVENTION

This invention fulfills the above-described needs in the art by providing a method and system for the transmission and reception of multiplexed orthogonal signals (e.g. spread spectrum) for use in a simplex or duplex digital communication system via wire-line or atmospheric free-space. In certain embodiments, the transmitter and receiver architectures are able to make use of the same set of orthogonal or approximately orthogonal signals (e.g. spreading signals) that are implemented in prior art orthogonal multiplexed systems with antipodal data modulation. This is advantageous for a system with high spectrum efficiency where it may be difficult to determine additional spreading sequences because of the time-bandwidth product limits. The method significantly reduces the crosscorrelation interference caused by the diminished orthogonality between the multiplexed signals as the result of multipath propagation and other dispersive effects. This interference is mitigated by reducing the number of orthogonal signals that are simultaneously transmitted, without affecting the bit rate throughout. In a preferred embodiment, the number of simultaneous signals is only half that required for antipodal modulation.

According to further embodiments, the biorthogonal modulation and unequal error protection aspects of this invention may be applied to QPSK systems, with or without frequency-division multiplexing (FDM), and/or the like.

According to certain embodiments, biorthogonal data modulation is used to determine which spreading signals are simultaneously transmitted and the polarity of such signals. The plurality of generated orthogonal signals is organized into a plurality of biorthogonal groups, wherein only a fraction of these signals are transmitted.

In certain embodiments, the number M of signals in each group is two. In such embodiments, each group conveys two information bits per symbol through the choice of signal (selection bit) and the polarity of the signal (polarity bit). Since only one signal from each group is transmitted, for all values of M, the number of simultaneous signals transmitted is reduced compared to the prior art system with equivalent throughput and antipodal modulation, which has two transmitted orthogonal signals when M=2. All signals across the plurality of groups are distinct and orthogonal. Thus, signals from a plurality of groups can be simultaneously transmitted and recovered without interference in the absence of multipath. When multipath is present, the crosscorrelation interference is reduced because of the diminished number of signals which can interfere with one another.

The use of biorthogonal data modulation combined with orthogonal multiplexing reduces crosscorrelation interference as set forth below with respect to this invention. However, the advantage that is obtained by reducing the number of simultaneously sent signals with multiplexed biorthogonal modulation may be further advanced by using unequal error protection. This invention results in an improvement in the decoded error rate when compared to both conventional biorthogonal and antipodal modulation. Thus, the viability of biorthogonal modulation for multiplexing spread spectrum signals in multipath is a direct result of the method. The benefits of the method are most significant when the multiplexed signals are wideband or spread spectrum orthogonal signals, although the system/method may be used with other signal types as discussed herein.

In certain embodiments, biorthogonal modulation conveys the total bit rate throughput, including error correction redundancy, equally divided among the selection bits and the polarity bits. The uncorrected error rate (i.e. prior to error code decoding) of the selection bits determined at the receiver is increased compared to an equivalent system with antipodal modulation, even with the method. According to certain biorthogonal embodiments of this invention, the polarity bit error rate is made to be substantially independent of the selection bit error rate. This is accomplished by weakening the coupling mechanism between the error probabilities of the selection and polarity bits through the use of coding gain from the error correction code. The result is an effective increase in the signal-to-noise (SNR) at the receiver in the determination of the polarity bits, when compared to antipodal modulation. The effective increase in the detection SNR of the polarity bits allows for the use of less error control redundancy on the polarity message bits (i.e. higher code rate), without increasing the resulting error rate compared to antipodal modulation. The overall ECC code rate is the average of the code rates for the selection and polarity bits. Therefore, while maintaining a constant overall code rate, increasing the code rate for the polarity bits allows for a corresponding decrease in the code rate for the selection bits. The system then has the characteristic of unequal error protection (UEP). Decreasing the code rate for the selection bits increases the redundancy afforded to the protection of the selection bits. Thus, the decoded selection bits are made more robust.

The error rate of the polarity bits is substantially de-coupled from the error rate of the selection bits by the receiver architecture of the system according to certain embodiments. In prior art biorthogonal systems, the polarity bits and selection bits are both determined prior to ECC decoding. However, according to certain embodiments of this invention, the selection bits are demodulated prior to the polarity bits. The error correction code corresponding to the selection bit information is completely decoded. The resulting estimate of the underlying data message bits for the selection bits is then re-encoded using the same ECC code. As a result of the coding gain of the ECC code, the error rate of the re-encoded selection bits is substantially lower than that of the selection bits prior to decoding. The re-encoded selection bits are then used to determine which correlation sums are examined in order to determine the polarity bits in the biorthogonal receiver. Unlike prior art systems, the error rate of the polarity bits is found to no longer be directly determined by the selection bit error rate prior to decoding. Instead, the polarity bit error rate is substantially determined by the conditional error probability of the polarity bits alone. The decreased error rate is shown to correspond to an effective increase in the detection SNR of the polarity bits by approximately three decibels in certain embodiments.

In addition to the improved error rate compared to both prior art antipodal and biorthogonal systems, the method is shown to reduce the effects of gain instability present at the receiver. Uncompensated amplitude variations in the received signal degrade the effectiveness of soft-decision convolutional decoding by the Viterbi algorithm, which is otherwise optimum in a maximum-likelihood sense. According to the method, the effects of gain instability are mitigated by the use of biorthogonal modulation and a normalized comparison metric in the determination of the selection bits, in contrast to the polarity metric of prior art antipodal systems.

DETAILED DESCRIPTION OF CERTAIN EMBODIMENTS OF THIS INVENTION

Figure 1:
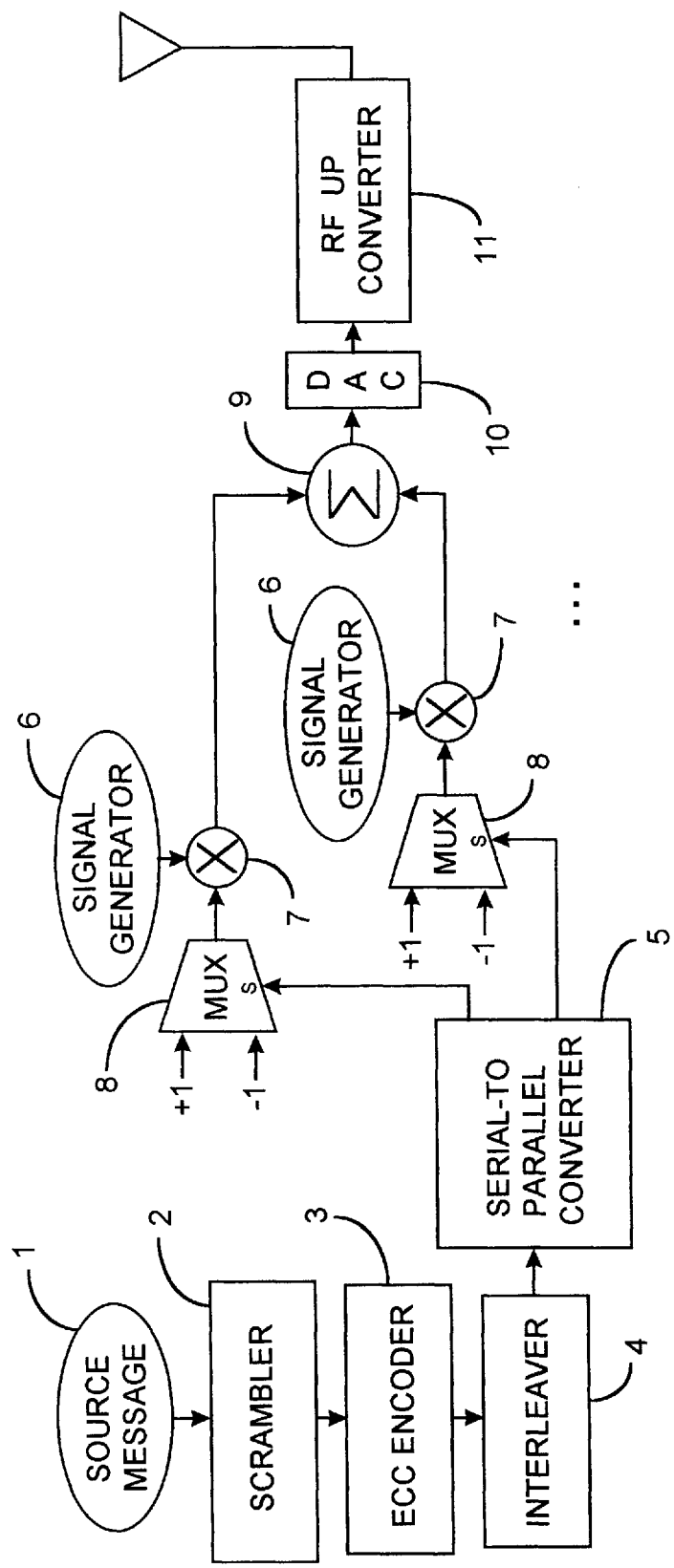
FIG. 1 is a block diagram of a transmitter for a prior art system with antipodal modulation and orthogonal multiplexing.

Referring now more particularly to the accompanying drawings in which like reference numerals indicate like parts throughout the several views.

Figure 9:
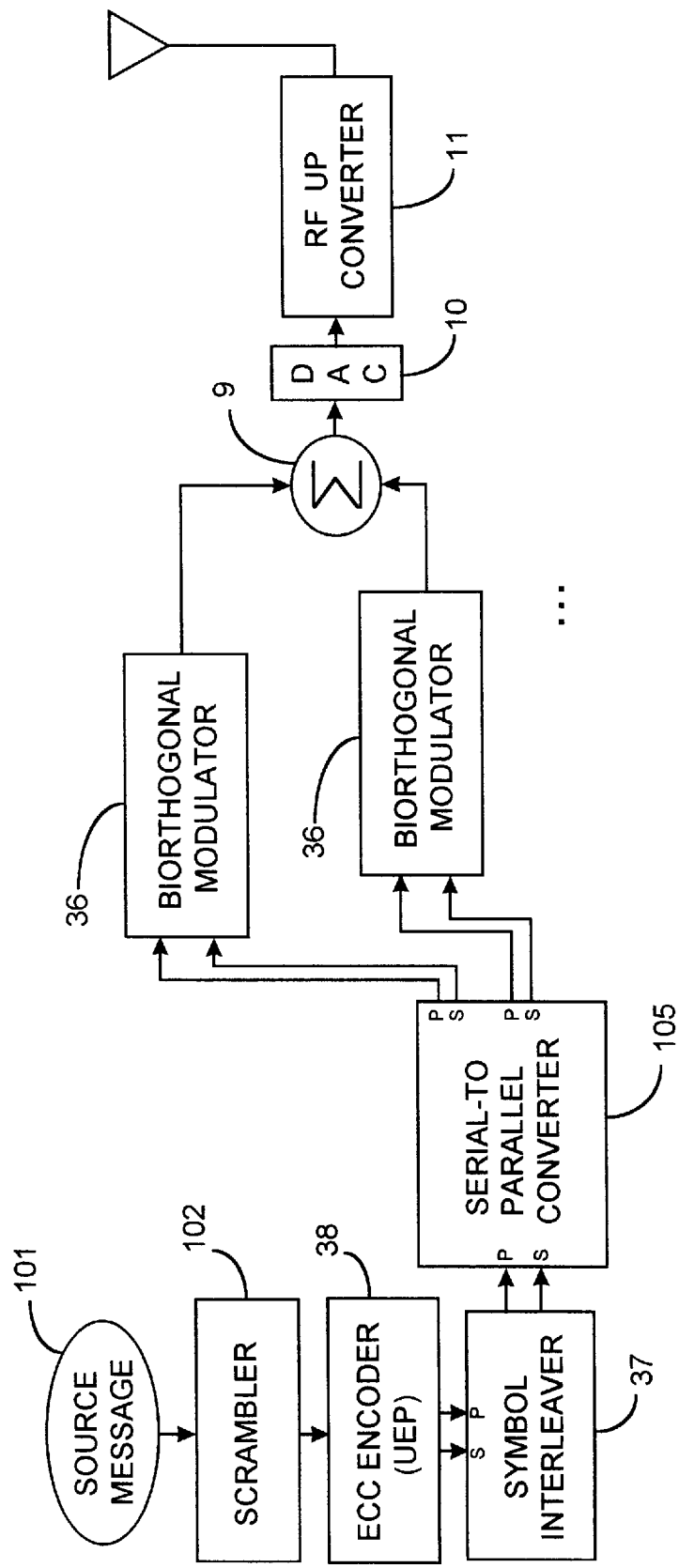
FIG. 9 is a block diagram of a transmitter system for biorthogonal modulation with orthogonal multiplexing according to an embodiment of this invention.

The block diagram of the transmitter system according to an embodiment of this invention is shown in FIG. 9. The prior art FIGS. 1–2 communication system with N (N is even) generated orthogonal multiplexed signals, all simultaneously transmitted with antipodal data modulation, is replaced with the system of FIG. 9 with only N/2 simultaneously transmitted orthogonal signals with biorthogonal data modulation. This results in a dramatic reduction in the crosscorrelation interference of a factor between three (3) and six (6) decibels relative to the antipodal system of FIGS. 1–2, when the orthogonality between signals is disturbed by multipath or dispersion. If the crosscorrelation interference across signals combines coherently, as is the case with specular multipath, the improvement is closer to six (6) decibels. If the crosscorrelation interference across signals combines incoherently, as with noise or diffuse multipath, the improvement is closer to three (3) decibels. The functional blocks in the FIG. 9 multiplexed biorthogonal transmitter corresponding to the digital-to-analog converter 10, and RF up-converter 11 are as in FIG. 1 for the antipodal system. The source message 101 is made substantially random by scrambler 102 for reasons discussed above regarding FIG. 1. In certain embodiments, separate scramblers are required for those message bits which are associated with the selection bits and those associated with the polarity bits, when the selection message bits are considered more important than the polarity message bits. The plurality of antipodal modulators, where each modulator is comprised of 6, 7, and 8 in FIG. 1, is replaced with a plurality of biorthogonal modulators 36 in FIG. 9.

The FIG. 9–15 system and method is adapted to transmit and receive RF signals with carrier frequencies more preferably from about 30 megahertz (MHz) to 8 gigahertz (GHz), where the effects of multipath propagation are significant. This frequency range includes commercial FM radio broadcast (88 MHz–108 MHz), television and advanced television (ATV) broadcast (54 MHz–88 MHz, 174 MHz–216 MHz, and 470 MHz–890 MHz), and the proposed ranges for terrestrial new-band, in-band on-channel (IBOC), in-band adjacent-channel (IBAC), and satellite digital audio radio services, such as L-band (1.0 GHz–2.0 GHz), S-band (2.0 GHz–4.0 GHz), and C-band (4.0 GHz–8.0 GHz). The system and method according to certain embodiments can also be used to transmit/receive signals at frequencies above 8 GHz, such as direct broadcast satellite (DBS) in the K bands (10 GHz to 36 GHz), but reception in these bands is typically limited by available signal strength in the line-of-sight propagation path. The system and method are not applicable to incoherent communication systems because biorthogonal modulation requires coherent detection. The system and method is utilized for carrier frequencies below 30 MHz (e.g. commercial AM radio band between 535 kHz and 1,705 kHz), where the transmission medium is subject to dispersion.

In addition to free-space propagation, this invention is applicable to wire-line systems such as telephone service, ISDN, ATM, SONET, and switched-56, where the transmitter and receiver are connected electrically. Although these wire-line system do not have multipath of the type described above, echoes caused by discontinuities and impedance mismatches can generate significant crosscorrelation interference. Furthermore, the characteristics of the electrical circuit connecting the transmitter and receiver, such as coaxial cable, typically have frequency-selective properties and cause dispersion. This invention mitigates these deleterious effects.

Figure 5:
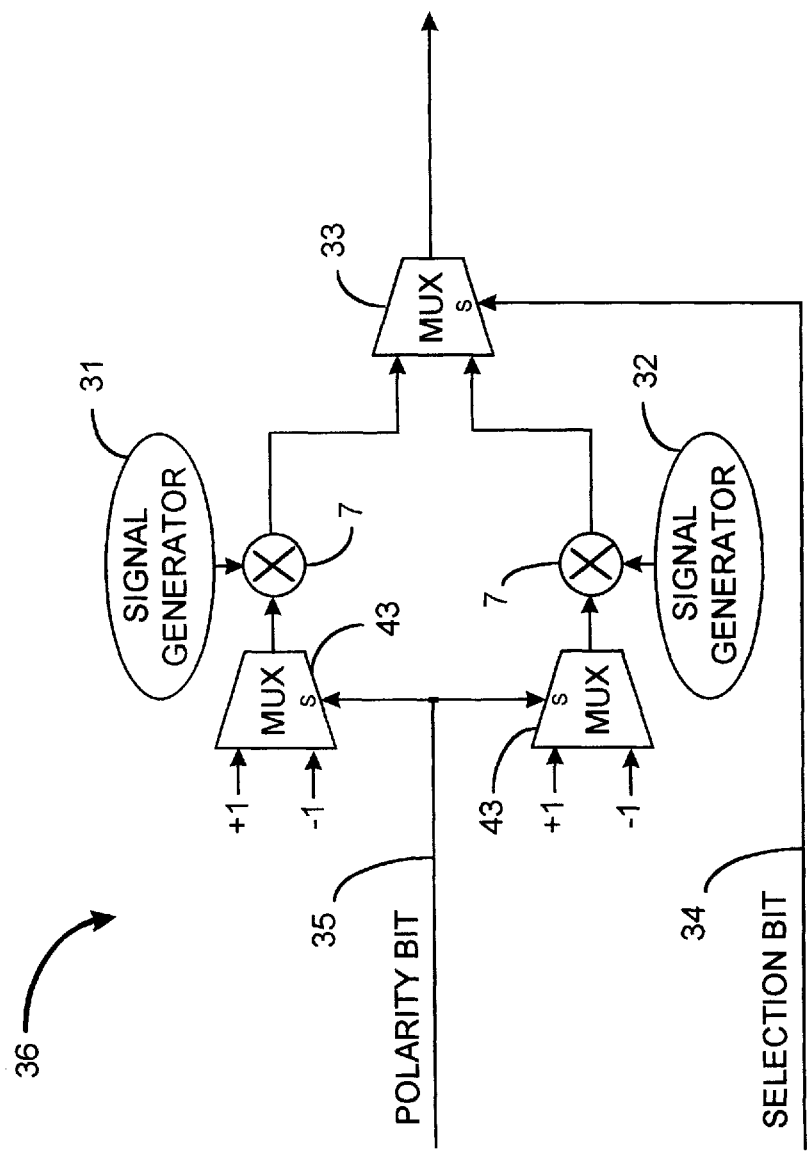
FIG. 5 is a prior art block diagram of a biorthogonal signal set modulator in a transmitter system with two generated orthogonal signals, one of which is transmitted.

Each biorthogonal modulator 36 of FIG. 9 is as shown in FIG. 5 for the embodiments of this invention where two orthogonal signals are present in each biorthogonal group (i.e. M=2). The time-diversity interleaver function 37 is also required, but its internal architecture is different from that 4 in FIG. 1. It will be discussed below that in order for the system to properly operate, it is necessary that the shuffling algorithm of interleaver 37 (and consequently the deinterleaver) possess the characteristic of symbol interleaving and not bit interleaving.

With conventional antipodal or prior art biorthogonal modulation without multiplexing, either a bit interleaver or a symbol interleaver can be implemented. The determination is made by understanding the characteristics of the RF propagation and the ECC method. Typically, bit interleavers are used for binary convolutional codes. Symbol interleavers are used for multiple-bit block codes (e.g. Reed-Solomon codes). The function of the interleaver in the transmitter and the deinterleaver in the receiver is to cause any temporal correlation between consecutively transmitted bits to be substantially eliminated by the shuffling process. The interleaver does not change the fundamental error rate, but its use results in an error distribution which resembles a random, uncorrelated process, which is important for optimum operation of the ECC. The difference between a bit interleaver and a symbol interleaver is that in a symbol interleaver, the bits are first divided into groups. Each group consists of a plurality of bits. The temporal relationship between consecutive groups is made substantially random by shuffling, but the ordering within the group is preserved by the interleaving process. The groups of bits are known as symbols. In a bit interleaver, the group size is one bit.

In the FIG. 9 transmitter system, the minimum width of the symbol in the interleaver 37 is two bits for the M=2 embodiment with two orthogonal signals in each biorthogonal group. This presumes that the encoded selection and polarity bits are organized as consecutive bit pairs. Therefore, the shuffling process of interleaver 37 does not change the characteristic that the polarity bit associated with a particular selection bit is immediately adjacent to that bit in the serial bit sequence. The symbol width can be increased beyond two bits by multiples of two. If convolutional ECC methods are implemented, it is not advantageous to increase the symbol width beyond the minimum because burst errors result in a degradation in the performance of the Viterbi decoding algorithm. However, if multiple-bit block codes are implemented, the optimum symbol size is related to the size of the binary field of the code. For example, the optimum symbol size for the Reed-Solomon block code over the Galois field in $2^m$ is m bits.

In the embodiments with two orthogonal signals in each biorthogonal group (M=2), the minimum interleaver symbol length is two bits, corresponding to the selection and polarity bit for each group. The maximum interleaver symbol length is determined by the characteristics of the error correcting code. For convolutional codes, the optimum length is two bits. However, for block error correcting codes such as Reed-Solomon, the optimum symbol size corresponds to the number of bits in the Galois binary-power field representation.

A further difference from the prior art antipodal transmitter system of FIG. 1 is that the amount of redundancy applied by error correction encoder 38 to the selection bits is greater than that applied to the polarity bits. This characteristic is labeled as unequal error protection (UEP). UEP methods are typically used in the prior art when the underlying message bits are of varying importance. However, in certain embodiments of this invention, UEP is used in the transmitter system even when the message bits are of equal importance as a consequence of the differentiation in error probabilities between the selection and polarity bits at the receiver as will be discussed below. The primary reason for the use of UEP in the system is due to the construction of the biorthogonal receiver according to the invention. Further description of UEP is provided below in the description of the receiver system architecture.

In the FIG. 9 biorthogonal system, a total signal set of N orthogonal signals is generated or used, although only N/2 are simultaneously transmitted when M=2. Therefore, the use of biorthogonal modulation in this embodiment does not increase the required size of the signal set compared to orthogonal multiplexing with antipodal modulation. This is important in communication systems where the required bit density is high (greater than one bit/symbol/Hz) and the time-bandwidth product is limited by either bandwidth restrictions or implementation complexity. In practical systems, the maximum duration of the baud interval is limited by both the transmitter and receiver complexity and the short-term temporal stability of the transmission medium. For example, Doppler frequency shift at high vehicle velocities (e.g. sixty-five miles per hour) limits the maximum baud interval in a mobile communication system for VHF frequencies to approximately one millisecond. The available bandwidth is typically limited by regulatory requirements for broadcast applications and, to a lesser extent, by complexity. Accordingly, an advantage of this invention is that no additional signals are required relative to antipodal prior art systems for the same bit rate throughput.

In the FIG. 9 system, there are N/2 simultaneous orthogonal signals in the composite transmitted signal. Each orthogonal signal is determined by biorthogonal modulation of a group of two orthogonal signals (i.e. M=2). Each group conveys two information bits through the selection and polarity bit information. The signals, in each group and across all groups, must be distinct and pairwise orthogonal because of the requirement for simultaneous orthogonal multiplexing across biorthogonal groups.

If additional orthogonal signals can be determined for each group (e.g. M=4 in FIG. 10), the method is extended so that each group is made up of M orthogonal signals, where M is a binary power (M>2). Each biorthogonal group conveys ($\log_2 M$)+1 information bits in a baud. For the communication system with an overall bit rate throughput of N bits per baud, the required number of generated or used orthogonal signals, designated L, is:

$$L = \frac{N}{(\log_2 M) + 1} \cdot M \tag{6}$$

For example, if M=2, L=N; if M=4, L=4N/3; and if M=8, L=2N. The number of simultaneously transmitted orthogonal signals in the composite signal for one baud interval, designated $N_L$, is given by equation (7):

$$N_L = \frac{N}{(\log_2 M) + 1} \tag{7}$$

Equation (7) shows that as the number of orthogonal signals M in the biorthogonal groups increases exponentially, the total number of simultaneously sent orthogonal signals that are required to convey the information rate decreases only linearly. For example, if M=2, $N_L=N/2$; if M=4, $N_L=N/3$; and if M=8, $N_L=N/4$. Increasing M further diminishes the crosscorrelation interference by reducing the number of simultaneous signals at the cost of requiring a total signal set of very large dimension. With biorthogonal data modulation, only $N_L$ signals are summed in the composite and simultaneously transmitted. However, in the receiver (see FIGS. 11–13) for biorthogonal modulation, it is necessary to correlate the received composite signal across the plurality of groups with L possible orthogonal signals in the biorthogonal receiver. Therefore, complexity requirements generally limit the practical value of M to no more than eight (8).

Figure 10:
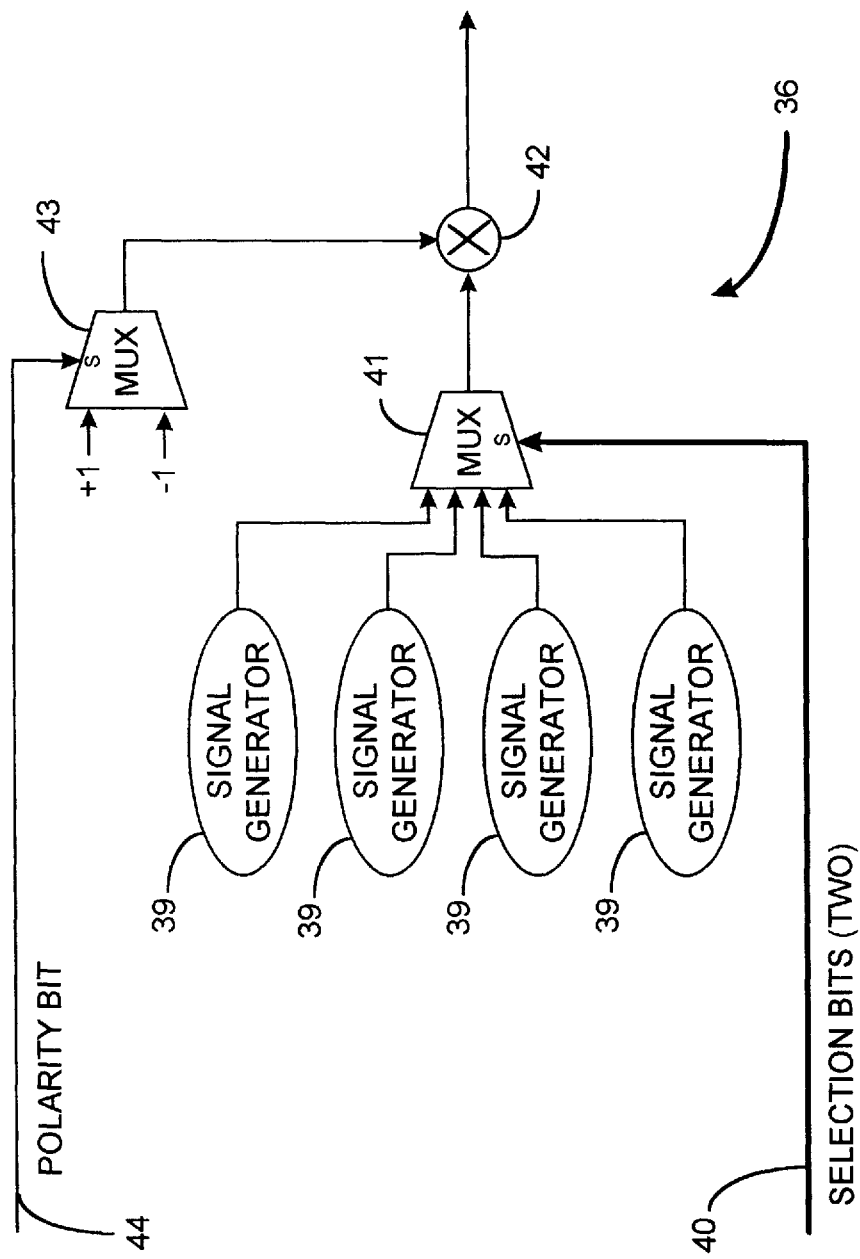
FIG. 10 is a block diagram of a biorthogonal modulator according to an alternative embodiment, when four orthogonal signals (M=4) are provided in each group, and only one orthogonal signal is transmitted for each group.

FIG. 10 is a block diagram of a biorthogonal modulator 36 for an alternate embodiment when M is four (4), which is the next smallest binary power of two. As shown in FIG. 10, there are four signal generators 39 for each group, each generator 39 corresponding to a different one of the four orthogonal signals. The two selection bits 40, control signal multiplexor 41, which has M or four signal inputs. The polarity of the signal determined by signal multiplexor 41 is established by multiplying 42 the resulting signal by either a positive or negative factor of unity, determined by polarity multiplexor 43, which is controlled by polarity bit 44. Regardless of the value of M, there is only one polarity bit in each biorthogonal modulator 36, while the number of selection bits increases logarithmically with M.

Figure 6:
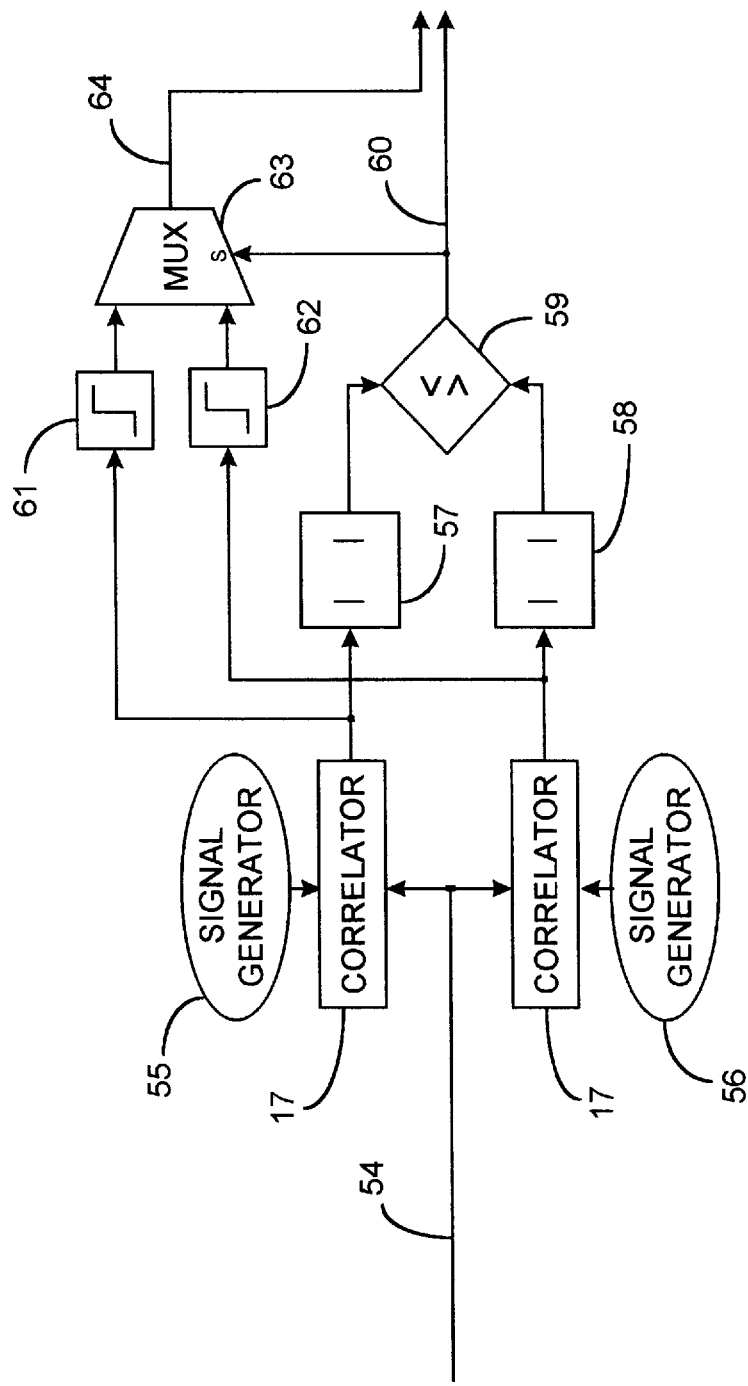
FIG. 6 is a block diagram of the prior art method of biorthogonal demodulation in the FIG. 5 communication system.
Figure 7:
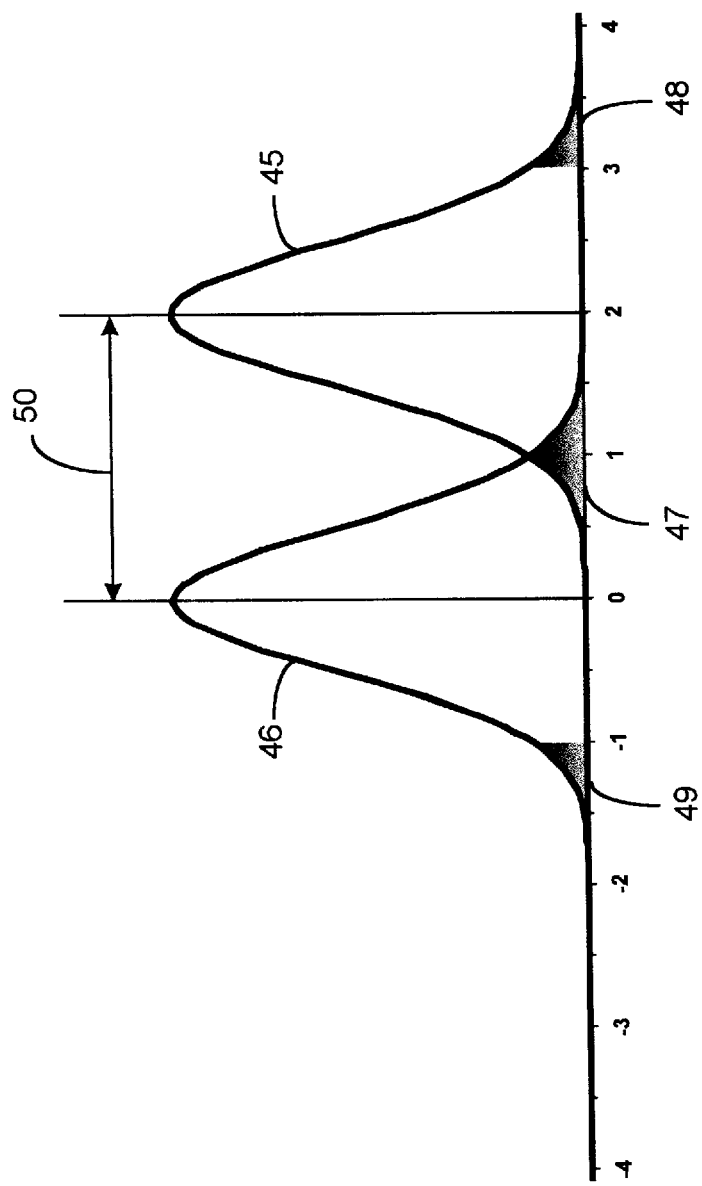
FIG. 7 is a graph illustrating an exemplary distribution of the correlation sums in the determination of the selection bit in the FIG. 6 prior art biorthogonal receiver when the impairment is AWGN.
Figure 8:
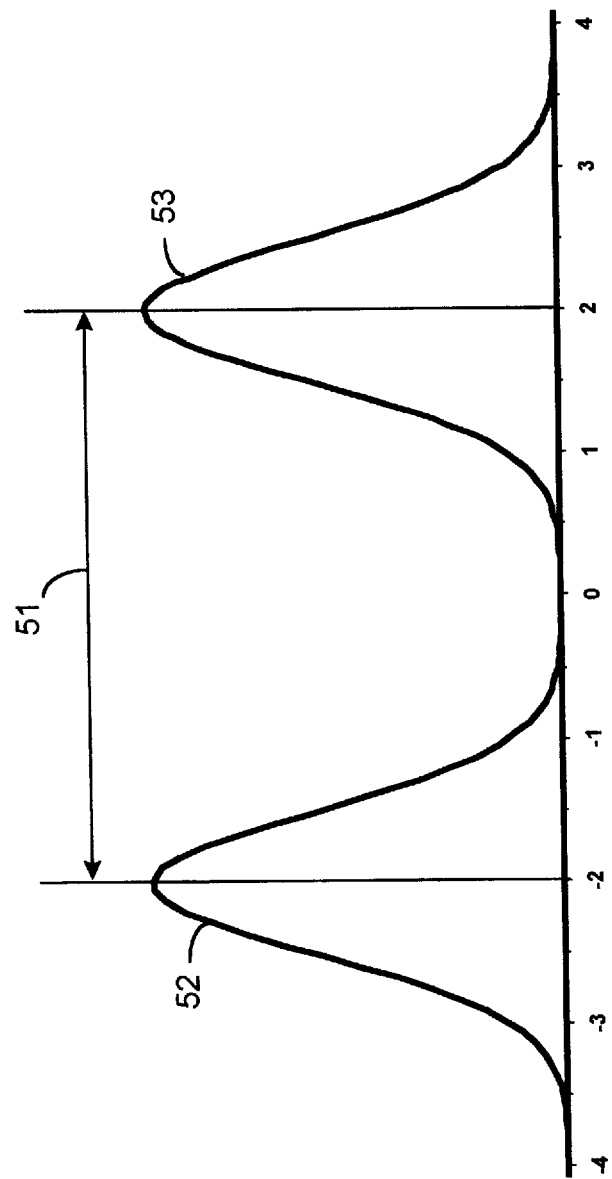
FIG. 8 is a prior art graph illustrating an exemplary distribution of the correlation sums in the determination of the polarity bits in the prior art FIG. 6 biorthogonal receiver when the impairment is AWGN and the selection bit is correctly demodulated.
Figure 11:
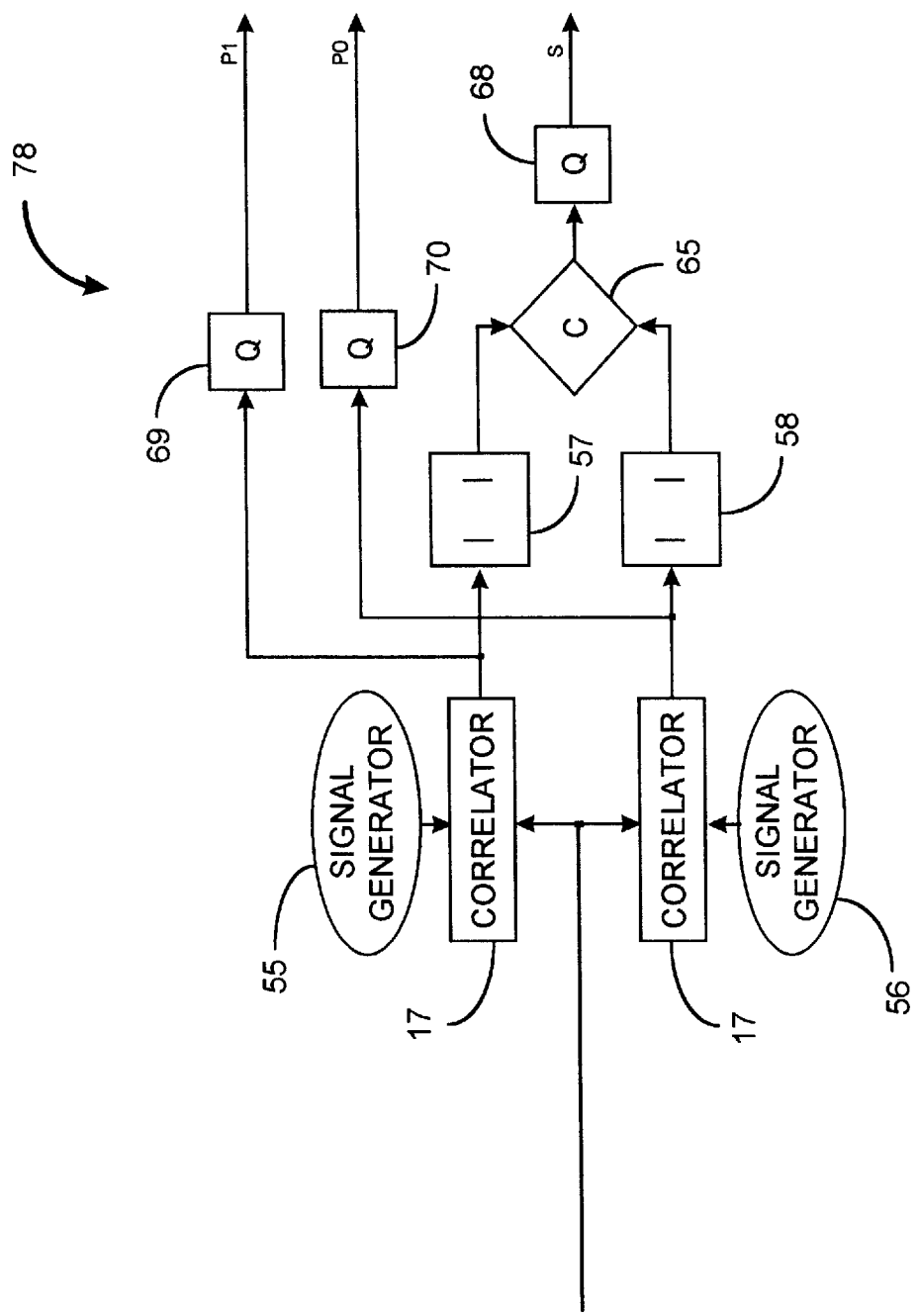
FIG. 11 is a block diagram of the biorthogonal demodulator for the receiver in the FIGS. 9 and 12 systems when M=2, this figure illustrating advantages over the prior art regardless of the number of biorthogonal groups.

FIG. 11 is a block diagram of the group demodulator for the FIG. 9 biorthogonal demodulation system according to an embodiment of this invention where M=2. The signal generators, correlators 17, and absolute-value functions 57, 58 are as in FIG. 6. However, comparator 59 in prior art FIG. 6, is replaced with the normalized comparison metric, C 65, in FIG. 11 which, according to the invention, is computed as the ratio:

$$C = \frac{|M_1| - |M_0|}{\max(|M_1|, |M_0|)} \tag{8}$$

Where $|M_1|$ is the absolute value of the correlation sum between the received signal and orthogonal signal 55, $|M_0|$ is the absolute value of the correlation sum between the received signal and orthogonal signal 56, and $\max(|M_1|, |M_0|)$ is a function with two operands which results in the larger of the operands $|M_1|$ and $|M_0|$. In certain embodiments, the signals are multiple bit digital sequences and the correlation sums are determined by digital arithmetic, so that the metric computation in equation (8) is also computed digitally. If the representation of the received signal requires complex digital arithmetic (i.e. real and imaginary parts), the absolute-value functions are instead complex magnitude functions. The result of equation (8) is quantized to a lesser number of bits by quantizer 68 and propagated as "S" beyond the biorthogonal group demodulator 78. For proper operation with this configuration, orthogonal signal 55 in the demodulator corresponds to signal 31 in the modulator and is associated with an encoded bit value of one and a positive metric C. Similarly, orthogonal signal 56 in the demodulator corresponds to signal 32 in the modulator and is associated with an encoded bit value of zero and a negative metric C.

When the statistics of the noise and/or crosscorrelation interference are approximately uncorrelated and Gaussian in distribution, the optimum ECC encoder configuration is to encode the selection message bits in the transmitter system of FIG. 9 with a nonsystematic convolutional code. Then the optimum ECC decoder 80 for the selection bits in the receiver system (FIGS. 11–13) is implemented with maximum-likelihood detection using the soft-decision Viterbi algorithm. For nominal operation of the Viterbi algorithm, the width of the quantized metric 78 is three (3) bits; the minimum width is one bit. Additional bits may be implemented but there is a negligible improvement in performance and the required amount of memory increases, particularly in the deinterleaver subsystem.

The limiters 61 and 62 of prior art FIG. 6 are replaced with polarity quantizers 69 and 70 in FIG. 11. The optimum bit width of polarity quantizers 69 and 70 depends upon the ECC coding that is applied to the polarity message bits in the transmitter system (FIG. 9). When a convolutional code with Viterbi detection is implemented, the effective width of each quantizer 69, 70 is at least three bits for optimum performance, but only one bit is required. For hard-decision decoding, only one bit is required for each quantizer, and the function of 69 and 70 becomes equivalent to limiting (i.e. one-bit quantization is equivalent to limiting). A key difference between the FIG. 11 method and the prior art is that polarity information as "P0" and "P1" for both of the correlation sums respectively is propagated beyond the biorthogonal group demodulator. No determination as to which of the polarity bit estimates is related to the selection bit estimate is made until after ECC decoding at 85 of the selection bits according to certain embodiments of this invention.

The function of metric C 65 in FIG. 11 resembles the function of comparator 59 in FIG. 6, but the use of metric 65 results in improved performance. The improvement due to the use of the metric is evident with or without orthogonal multiplexing. In both cases, the magnitudes of the two correlation sums are compared in order to determine which of the sums is larger. The advantage in using normalized comparison metric 65 instead of the prior art comparator is twofold: metric 65 preserves soft-decision reliability information for later use in the ECC decoding; and metric 65 normalizes the comparison so that the reliability information is insensitive to uncompensated amplitude fluctuations in the received signal. The latter advantage is unique to the use of metric 65 and biorthogonal modulation.

An advantage of biorthogonal modulation in FIGS. 9–13 relative to the prior art is that normalized comparison metric 65 is insensitive to amplitude fluctuations (hence, its designation). As the received signal amplitude varies, so do both of the correlation sums, $|M_1|$ and $|M_0|$, in the numerator of the equation (8) ratio C. The denominator term in the ratio C, being the largest correlation sum magnitude, also varies in a manner that is proportional to the amplitude fluctuation. Therefore, the effect of a multiplicative variation in gain is common to both the numerator and denominator terms in C, and the ratio remains approximately constant. The purpose of the maximum-value function in the denominator of the comparison metric is to cause the resulting ratio to be restricted to values between minus one (−1) and positive one (+1), inclusive (i.e. normalized).

Receivers for mobile communication systems (e.g. RF) include automatic-gain-control (AGC) subsystems, which attempt to minimize the fluctuations in the received signal amplitude. However, the reaction time of an AGC subsystem is limited, particularly when there is an abrupt change in signal amplitude (e.g. amplitude differences greater than 10 decibels when traversing only a few carrier wavelengths). During the transition interval, the received signal gain may vary widely before it stabilizes. When the receiver is in-motion in very difficult multipath environments, the AGC subsystem may not converge to a constant amplitude because of the continuous variations in the received signal energy. The purpose of the reliability information is to improve the performance of the Viterbi decoding algorithm for convolutional codes (known as soft-decision detection). The maximum coding gain that can be obtained by the use of soft-decision detection is three decibels when compared to hard-decision detection, which is equivalent to limiting. In a receiver system with poor amplitude control or in severe multipath, there is a loss in coding effectiveness of one to two decibels from the best-case gain of three decibels due to the problem of gain instability with antipodal modulation. Thus, the advantage of having the additional reliability information may be significantly reduced with antipodal modulation and gain instability.

In contrast to the previous paragraph, the receiver system (FIGS. 11–13) of the invention does not exhibit soft-decision coding loss for the selection bits due to gain uncertainty. This characteristic is the consequence of using normalized comparison metric 65 and biorthogonal modulation. Normalization does not compensate for the decrease in the SNR that could be caused by gain changes which lower the signal level without affecting the level of the noise similarly. In addition, the polarity bit demodulation is still susceptible to amplitude fluctuations because the determination of the polarity bits in the biorthogonal receiver requires antipodal detection of one of the correlation sums. If the selection bits are correctly decoded, then there is an SNR advantage in the determination of the polarity bits. As the value of the SNR increases, the loss due to gain variation also diminishes, so the effect of gain instability on the polarity bits is less severe than on the selection bits. If the mechanism for the determination of the ratio is too complex to implement in certain embodiments, even with only two or three bits, the normalization (i.e. denominator) is omitted, but the receiver is then more sensitive to gain fluctuations.

The operation of the biorthogonal demodulator can be extended beyond the embodiment in FIG. 11 where there are only two orthogonal signals in each biorthogonal group (i.e. M=2). In a general case, there are a plurality of M correlators, absolute-value functions, and quantizers in the demodulator in order to determine the correlation sums for each biorthogonal group. The most significant difference between the M=2 and the general case, M>2, is that normalized comparison metric C 65 is replaced with the maximum-value function. The maximum-value function used when M>2 compares the M correlation sum magnitudes in order to determine the largest. The selection bit encoding corresponding to the largest magnitude sum is demodulated as the selection bit estimate prior to ECC decoding.

In the specific embodiment where M=4, if the four correlation sum magnitudes, corresponding to the four orthogonal signals in the biorthogonal group, are labeled as $|M_i|$ for the indices 1, 2, 3, 4, (i.e. $|M_1|$, $|M_2|$, $|M_3|$, and $|M_4|$), then the form of the generalized metric 65 is the indicator function $CM_i$, which replaces the comparison metric C when M>2. The function $CM_i$ is defined as:

$$CM_i = \begin{cases} 1 & \text{if } |M_i| = \max(|M_1|, |M_2|, |M_3|, |M_4|) \\ 0 & \text{else} \end{cases} \qquad (9)$$

The indicator function results in the binary value one if and only if the index corresponds to the maximum correlation sum magnitude. The function is evaluated for all indices. The index corresponding to an indicator value of one is used together with a table look-up to determine the encoded value for the selection bits (e.g. two-bit values 00 for index 1, bit values 01 for index 2, bit values 10 for index 3, and bit values 11 for index 4). A disadvantage of this function is that it does not preserve soft-decision reliability information; it only determines which of the orthogonal signals in the group was most likely to have been sent. If the maximum correlation sum magnitude in equation (9) is labeled as $|M|$ (i.e. $|M|=\max(|M_i|)$), a measure of the reliability of the decision can be associated with the function calculated in equation (9) by computing the difference between $|M|$ and the next largest correlation sum magnitude and then normalizing the difference by $|M|$. The normalized reliability estimate is defined as:

$$R_M = \frac{|M| - \max_{\neq |M|}(|M_1|, |M_2|, |M_3|, |M_4|)}{|M|} \qquad (10)$$

$R_M$ is non-negative. As the value of $R_M$ increases away from zero, towards positive one (+1), the reliability of the decision is found to increase. A $R_M$ value of zero indicates that there is an ambiguity in the determining the largest correlation sum. $R_M$ is quantized to a lesser number of bits (typically two or three) to limit implementation complexity.

According to certain embodiments of this invention, in biorthogonal demodulator 78 shown in FIG. 11, both of the correlation sums, which correspond to the crosscorrelation between the received signal and the two orthogonal signals in the biorthogonal group when M=2, are propagated after quantization. The result of the normalized comparison metric 65 is the estimate of the encoded selection bit. However, unlike the prior art receiver of FIG. 6, biorthogonal demodulator 78 does not determine which of the two polarity bit estimates is relevant. Therefore, the demodulation of the polarity bits is incomplete.

Figure 2:
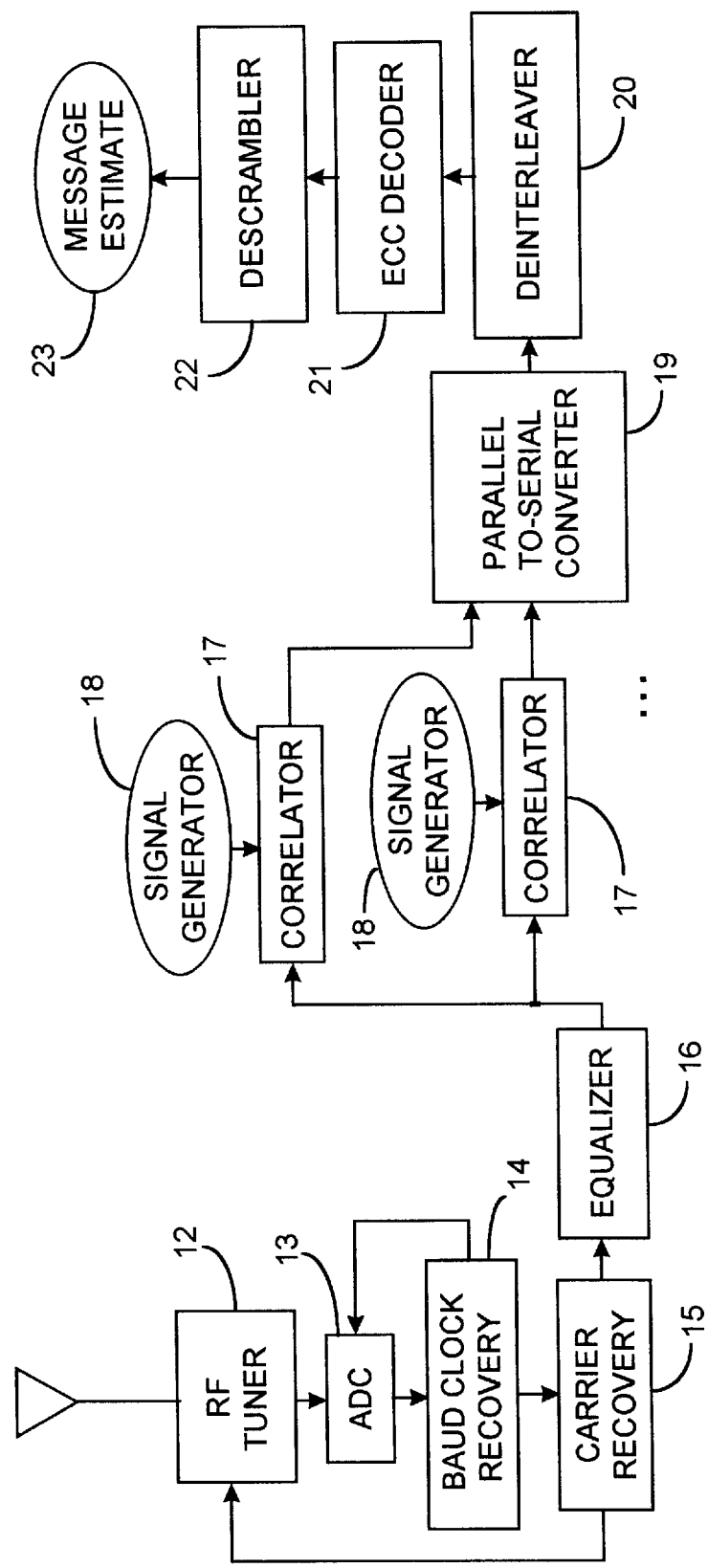
FIG. 2 is a prior art block diagram of the FIG. 1 corresponding receiver.
Figure 3:
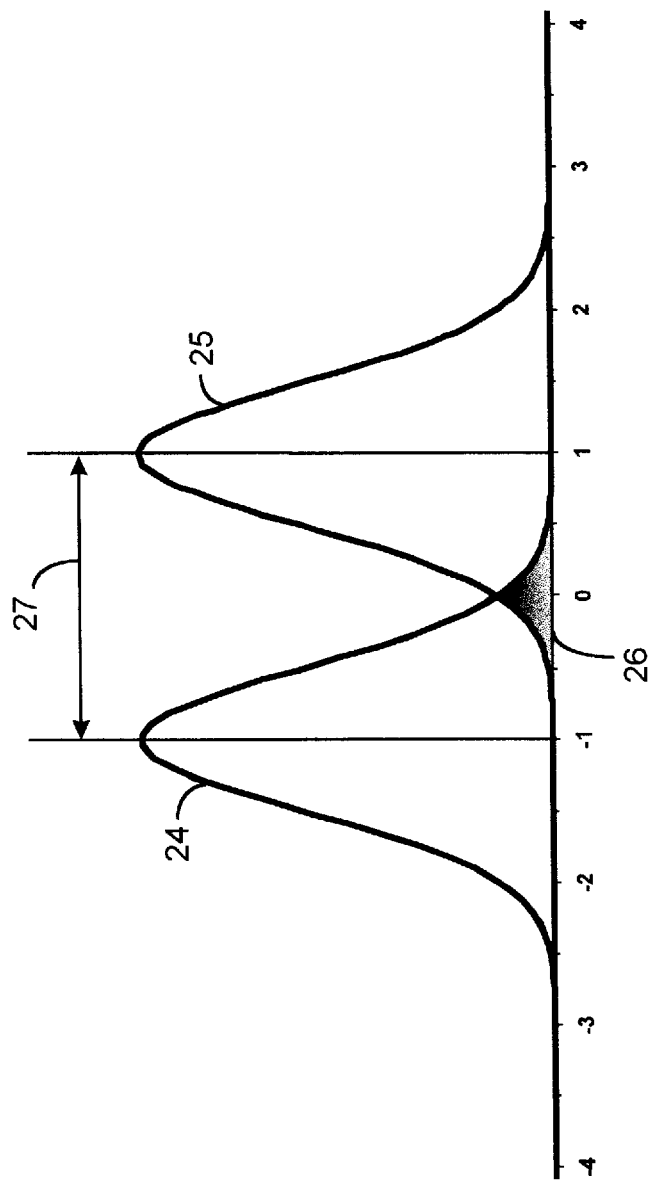
FIG. 3 is a prior art graph illustrating an exemplary distribution of the correlation sums determined in the FIG. 2 receiver for one of the signals in the multiplexed orthogonal system using antipodal modulation when the impairment is additive white Gaussian noise (AWGN).
Figure 12:
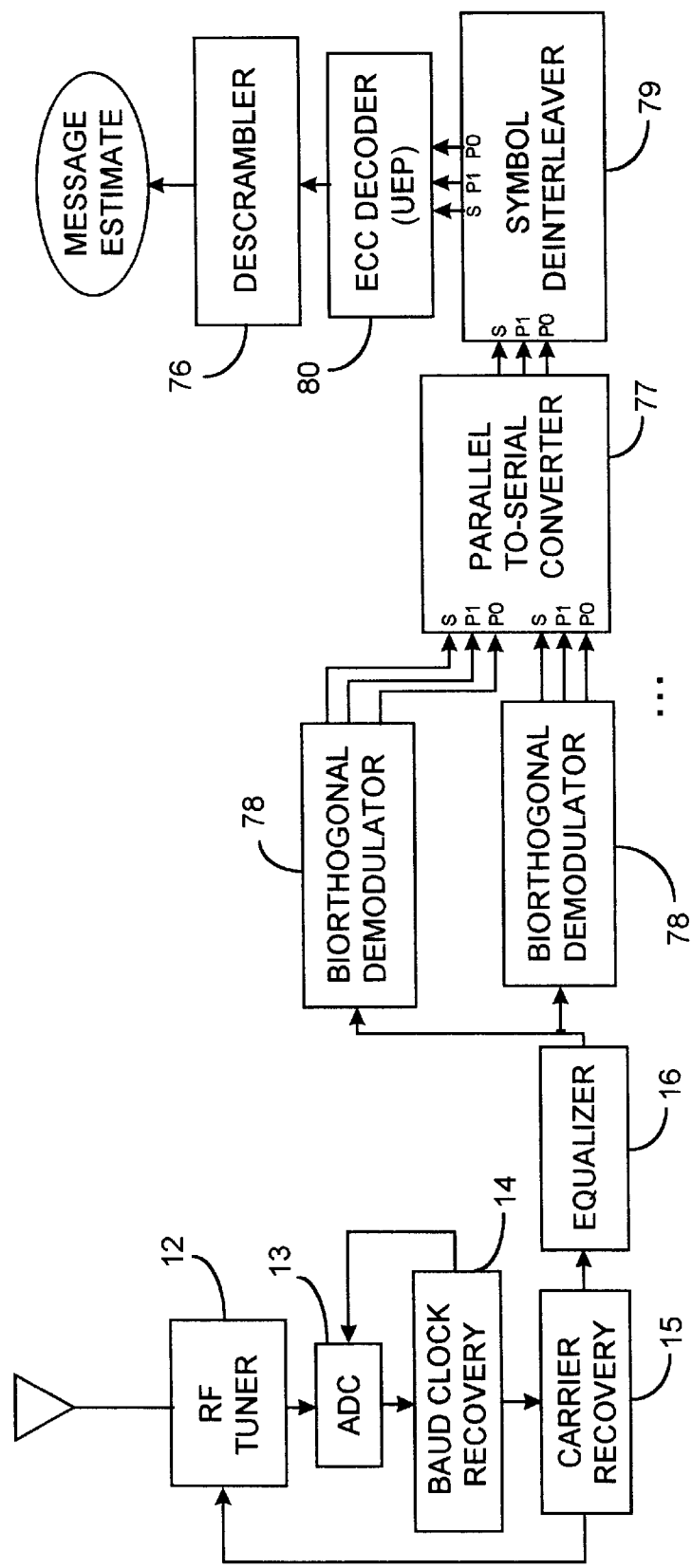
FIG. 12 is a block diagram of a receiver system for biorthogonal modulation and orthogonal multiplexing according to an embodiment of this invention.
Figure 13:
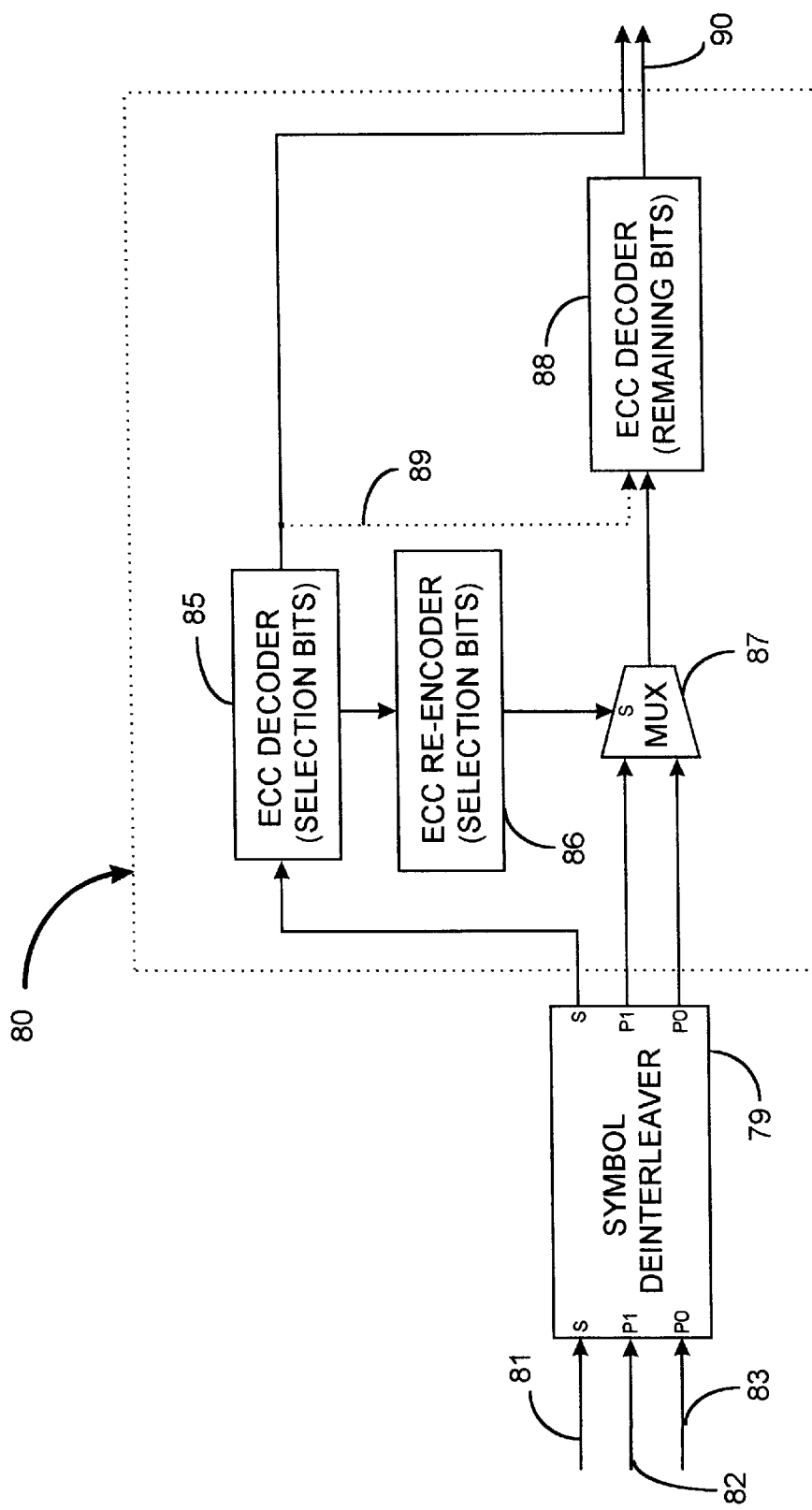
FIG. 13 is a block diagram of the symbol deinterleaver, polarity bit demodulator, and error correction decoder subsystems in the FIG. 12 receiver system for biorthogonal modulation and orthogonal multiplexing, although this subsystem may be used even without multiplexing.

FIGS. 12 and 13 are block diagrams that illustrate the subsystems in the receiver system, beyond each biorthogonal demodulator 78. With reference to FIG. 12, the RF-tuning 12, A/D data-conversion 13, synchronization 14 and 15, and equalization 16 subsystems are similar to those in the prior art antipodal receiver system (FIG. 2). In addition, descrambling 76 subsystem is not substantially different from the prior art antipodal receiver system. The parallel-to-serial converter 77 is still required, but its operation is different from the prior art antipodal system. Each group of biorthogonal signals in the plurality with orthogonal multiplexing has a corresponding biorthogonal demodulator 78, one of which is shown in FIG. 11, and has already been described. The number of demodulators 78 required or used may, of course, be substantially greater than the two shown in FIG. 12. Deinterleaver 79 and error correction decoder 80 are unrelated to the prior art antipodal receiver system.

The plurality of biorthogonal group demodulators 78 in FIG. 12, generate sequences of bits (S, P0, P1) which correspond to the quantized normalized comparison metric sums and quantized correlation sums. According to equations (6) and (7), for the specific embodiment of N orthogonal signals with two orthogonal signals in each biorthogonal group (i.e M=2), N/2 metric sums and N correlation sums are propagated beyond each demodulator 78. The bit sequences are arranged in a serial, sequential manner by the parallel-to-serial converter 77.

With reference to FIG. 13, each element in the resulting sequence consists of one metric sum 81 and two correlation sums 82 and 83, each of which is implemented with a plurality of bits. Each element is propagated to symbol deinterleaver 79, which reverses the shuffling implemented in the corresponding symbol interleaver 37 of the biorthogonal transmitter system in FIG. 9.

A specific internal structure is provided for deinterleaver 79. The requirement for a symbol interleaver in the transmitter system of FIG. 9 in order to preserve the relationship between the polarity bits and selection bits was previously described. In the FIGS. 11–13 receiver system, the relationship between the estimated selection and polarity bits must also be preserved through the deinterleaver 79 shuffling. Since the determination of which of the correlation sums is relevant is not made in each biorthogonal demodulator 78, both correlation sums (i.e. polarity bit estimates) are related to the selection bit estimate. Therefore, the minimum width of the symbol deinterleaver for the comparison metric together with the polarity estimates for the biorthogonal system with M=2 is three (3) bits. The optimum width is larger if reliability information for soft-decision decoding is required. The optimum width for the system with convolutional error coding applied to both the selection and polarity bits with soft-decision decoding is nine (9) bits. In some circumstances, where the SNR is relatively high (e.g. greater than 15 decibels) or where the amount of memory available for the deinterleaving is insufficient to accommodate the extra bits or where hard-decision block error coding is applied to the polarity bits, the correlation sums (i.e. polarity bit estimates) can be quantized to one bit each, which requires an overall deinterleaver symbol size of five (5) bits. When the method is extended beyond the receiver system with M=2, the symbol size of the deinterleaver is increased because there are, in general, M correlation sums and an indicator function which corresponds to $\log_2 M$ estimated selection bits, with associated reliability information, determined by equations (9) and (10), for each biorthogonal group demodulator. Similarly, the symbol interleaver 37 in FIG. 9 is extended in the general case so that each symbol corresponds to $\log_2 M$ selection bits and one polarity bit.

In the prior art method for multiplexing orthogonal signals with antipodal modulation, shown in FIGS. 1 and 2, a symbol interleaver (and consequently symbol deinterleaver) is not required because the modulation processes occur subsequent to the interleaver in the transmitter, and the demodulation processes precede the deinterleaver in the receiver. The internal structure of the interleaver and deinterleaver is irrelevant as long as there is a bijection between the unshuffled and shuffled bits. This also applies to the prior art method of biorthogonal modulation without multiplexing, shown in FIG. 5. The requirement for the symbol interleaver and symbol deinterleaver is a consequence of the use of the receiver according to this invention, where the polarity bits are not entirely determined in each biorthogonal demodulator. This is evident regardless of the type of ECC (i.e. convolutional or block coding) applied to the selection and polarity bits.

In the FIGS. 11–13 receiver system according to certain embodiments of this invention, the decision as to which of the polarity bit estimates (P0, P1) is relevant is not determined until beyond deinterleaver 79, while the estimate of the selection bit is determined in demodulators 78. If the shuffling of the serialized sequence caused by deinterleaver 79 disrupts the relationship between the selection and polarity bit estimates, then after deinterleaving, it is difficult to implement the tracking mechanisms that would be required in order to determine which polarity bit estimates correspond to a particular selection bit estimate. It has already been shown in equation (5) that if the selection bit is incorrectly identified, whether by error or by examination of the wrong corresponding polarity bit estimate, the error probability of the polarity bit escalates to one-half ($\frac{1}{2}$).

The direct coupling between the probability of error for the selection and polarity bits in the prior art demodulator of FIG. 6 is a significant disadvantage to the use of biorthogonal modulation. According to the invention, the receiver system of FIGS. 11–13 effect to diminish the coupling between the error probabilities. FIG. 13 is a block diagram of deinterleaver 79, polarity bit demodulator, and error correction decoder 80 subsystems. After symbol deinterleaving 79, the encoded selection bits are ECC decoded by selection bit ECC decoder 85 in order to determine the estimated scrambled source message bits which were associated with the encoded selection bits by the ECC encoder in the transmitter system. The decoded message bits are then re-encoded by selection bit ECC re-encoder 86. The characteristics of ECC re-encoder 86 in the receiver system and ECC encoder 38 in the transmitter system are identical with regard to the selection bits. The function of ECC re-encoder 86 is to generate the encoded selection bit sequence from the decoded selection bit estimate. In certain embodiments when convolutional coding is applied to the selection bits, ECC re-encoder 86 is preset to the same initial state as ECC encoder 38 in the transmitter system because of the memory effects of the code. The initial or preset state may be the all-zeroes state, for example. The use of a convolutional code for the selection bits has the advantage, compared to most block codes, that the implementation of re-encoder 86 is straightforward and requires a minimum amount of hardware. Convolutional encoders are implemented with tapped linear shift-feedback registers as described by A. J. Viterbi [reference: A. J. Viterbi, "*Convolutional codes and their performance in communication systems,*" ibid.].

The re-encoding process 86 generates the encoded selection bit sequence corresponding to the decoded selection bit estimate. The re-encoded selection bit sequence will have considerably fewer errors compared to the selection bit estimate determined in each biorthogonal demodulator 78, prior to ECC decoding 85, because of the effect of ECC coding gain. The re-encoded selection bits are used to determine which one of the correlation sums, after deinterleaving 79, is propagated by multiplexor 87. Once the determination as to which of the correlation sums is relevant (P0 or P1) is made by selecting between the correlation sums, the demodulated polarity bit estimate is ECC decoded by remaining ECC decoder 88.

In one embodiment, which is described below, the decoded selection bits undergo further ECC decoding 88 together with the demodulated polarity bits. This data path is shown in FIG. 13 as dotted line 89. Otherwise, no further ECC decoding of the selection bits is performed. After ECC decoding, the decoded selection and polarity bits are a serial sequence of estimated source message bits 90 except that they remain scrambled. The sequence is propagated beyond the ECC decoder subsystem 80 for final descrambling 76, described previously. If the selection and polarity message bits are of varying importance, separate descramblers are required.

The error probability for the polarity bits is described by equation (5) for the FIG. 6 prior art biorthogonal receiver. Equation (5) is not relevant to the biorthogonal receiver system of this invention because it does not take into consideration the effect of coding gain. According to certain embodiments of this invention (FIGS. 9–13), it has been discovered that the probability of error for the polarity bits, $P^P_b$, prior to ECC decoding 88 of the polarity bits is:

$$P^P_b = P^{S,D}_b \cdot \tfrac{1}{2} + (1 - P^{S,D}_b) \cdot P^{P|S}_b \qquad (11)$$

where the error probability of the selection bit, $P^S_b$, as in equation (5), is replaced with the error probability of the selection bit after ECC decoding 85 and re-encoding 86 $P^{S,D}_b$, in equation (11). The value of $P^{S,D}_b$ is several orders of magnitude smaller than $P^S_b$ because of the ECC coding gain except when the error rate is extremely high (around $1 \times 10^{-1}$), where the performance of ECC methods, in general, deteriorates.

The probability of error in determining the selection bits prior to ECC decoding 85 is twice that of the equivalent antipodal system as shown in equation (3). The method of this invention does not change this characteristic. However, the error rate of the ECC decoded 85 and subsequently re-encoded 86 selection bit sequence is much less than the error rate of the prior art antipodal system prior to decoding, provided that a sufficiently low rate (i.e. high redundancy) code is applied to the selection bits. Thus, certain embodiments of this invention eliminate the undesirable characteristic of the prior art method and system of reception for biorthogonal modulation where, at best, the polarity bit error rate could only approach that of the equivalent antipodal system.

For practical SNR values where the receiver system (FIGS. 11–13) is expected to properly operate (e.g. greater than about 4 decibels), the re-encoded 86 selection bit probability of error is sufficiently small that it may be ignored (i.e. $P^{S,D}_b < 1 \times 10^{-3}$ implies $1 - P^{S,D}_b \approx 1$). By equation (11), the polarity bit error rate, $P^P_b$, prior to its own specific ECC decoding 88, is then approximately equal to the polarity bit conditional probability of error, $P^{P|S}_b$, which was shown in equations (4A) and (4B) to have about a three decibel advantage in SNR compared to the prior art antipodal system.

This invention does not reduce the probability of error for the selection bits prior to ECC decoding 85. However, the SNR advantage in the polarity bit determination can be used to improve the overall error probability by decreasing the code rate for the selection bits, which increases the redundancy and consequently lowers the probability of error after decoding. Again, using the first-error event approximation, the decoded error rate for the polarity bits, $P^{P,D}_b$ is approximately:

$$P^{P,D}_b \approx Q\left(\sqrt{\frac{2 \cdot 2 \cdot E_s \cdot d_{eff}}{N_{b0}}}\right) \qquad (12)$$

where $d_{eff}$ is the ECC coding gain for the code applied to the polarity bits. By inspection of equation (12), $d_{eff}$ can be reduced by a factor of up to two (i.e. $2 \cdot d_{eff}/2 = d_{eff}$) and the decoded polarity bit error rate will still be approximately equal to that of the equivalent-throughput antipodal system with the same coding, which was given by equation (2). Therefore, a higher rate code (which will have a smaller $d_{eff}$), can be applied to the polarity bits without sacrificing the error performance of the polarity bits when compared to the prior art antipodal system.

The overall code rate, R, for the encoded selection and polarity bits together is the sum of the product of the code rates and the number of encoded bits for each code. R is found to be:

$$R = \frac{\log_2 M}{1 + \log_2 M} \cdot R_S + \frac{1}{1 + \log_2 M} \cdot R_P \qquad (13)$$

where the selection bit code rate is $R_S$, and the code rate for the polarity bits is $R_P$. For an embodiment with two orthogonal signals in each biorthogonal group (M=2), equation (13) simplifies to the arithmetic mean of $R_S$ and $R_P$. The transmitter and receiver systems are designed so that the overall bit rate accommodates the message throughput when burdened by the ECC overhead. Therefore, the required system throughput is the product of the necessary data message throughput and the reciprocal of the overall code rate. An increase in the code rate for the polarity bits means that the code rate for the selection bits can be decreased without changing the overall code rate. For a multiplying factor, F (F>1), in the polarity bit code rate, it has been found that the corresponding change factor, G (G<1), in the selection bit code rate so that the overall rate is unchanged is:

$$G = \frac{R_P}{R_S \cdot \log_2 M} \cdot (1 - F) + 1 \qquad (14)$$

For example, for an embodiment with two orthogonal signals in each biorthogonal group (M=2), if $R_P = R_S = \tfrac{1}{2}$, and if $F = \tfrac{4}{3}$, which corresponds to a thirty-three percent (33%) increase in the code rate for the polarity bits, hen according to equation (14), $G = \tfrac{2}{3}$. Thus, the code rate for the selection bits could be lowered from rate $\tfrac{1}{2}$ to rate $\tfrac{2}{3} \cdot \tfrac{1}{2} = \tfrac{1}{3}$. There is a significant decrease in the decoded error rate as the code rate is lowered below $\tfrac{1}{2}$, especially when the SNR value is relatively low (e.g. less than about 10 decibels). The improvement in error performance, after ECC decoding, brought about by the use of a low rate code for the selection bits more than compensates for the slightly inferior error rate of the selection bits in biorthogonal modulation prior to decoding, when compared to prior art antipodal modulation.

The optimum distribution of the average code rate between the selection and polarity bit code rates depends upon the characteristics of the data message that is conveyed from the transmitter system to the receiver system. In certain embodiments, it is desirable that the decoded error rate of the message bits is approximately equal for all bits. Thus, the decoded error rates for the selection and polarity bits must be approximately equal. This circumstance is typical when the source message represents arbitrary digital data. For these systems, if the overall code rate is $\tfrac{1}{2}$ (which is a common value for mobile communication systems), the optimum selection bit code rate, $R_S$, is found to be between about $\tfrac{1}{3}$ and $\tfrac{1}{4}$, inclusive. However, in communication systems which transmit and receive digital data that has been significantly compressed with respect to the original information source (e.g. source coding), the importance or priority level of the message bits is not equally distributed among all bits.

The transmission and reception of digital audio and/or video data by compression standards such as the MPEG specification [reference: ISO/IEC 11172-1/2/3, "*Information technology—coding of moving pictures and associated audio for digital storage media at up to about 1.5 Mbit/s,*" Geneva, Switzerland, pp. 140–142, 1993] is an example of a communication system application where the bit importance varies considerably. Bits in data fields associated with synchronization, table-decoding, and exponent magnitudes known as scale-factors, are found to be much more important than those associated with mantissa information, especially the bits in the mantissa of lesser-significance corresponding to small binary powers. The bit importance is defined by the subjective evaluation of the resulting impairment in the reconstruction of the audio and/or video data in the receiver. Bit errors in the mantissa bits may be unnoticed or cause small audio and/or video artifacts, but bit errors in synchronization fields may cause catastrophic failure such as muting or video blanking.

When biorthogonal modulation with orthogonal multiplexing, according to this invention, is used in a communication system where there is significant differentiation in bit importance, then the bits of highest importance are to be associated with the selection bits. Furthermore, the code rate associated with the encoded selection bits is further lowered so that, after decoding, the error rate of the selection bits is smaller than the error rate of the decoded polarity bits. As previously described, separate scramblers and descramblers are required for the message bits to be associated with the selection and polarity bits. If, for example, the overall code rate is ½, this is found to be the case when selection bit code rate is significantly less than ⅓, typically ¼. As the code rate is decreased, the message throughput also decreases because the redundancy information occupies an increasing number of bits. For example, if $R_S$ is ½, there are half as many selection message bits, after decoding, as there are selection code bits prior to decoding. However, if $R_S$ is reduced to ¼, the message throughput is only one-quarter of the coded throughput for the selection bits, which means that the majority of the source message bits are conveyed by the encoded polarity bits, which are protected by much less ECC redundancy. Codes with rates lower than ¼, while being very robust, have the disadvantage of very low throughput and are only useful for selection bit encoding if there is a large (at least an order of magnitude) differentiation in bit importance and if there is only a small amount (less than 20%) of high importance data.

Various algorithms can be used in the ECC encoding and, consequently, decoding with the invention. The performance of low rate (less than or equal to ½) nonsystematic convolutional codes with soft-decision decoding is superior to all known block codes with the same rate when the error distribution is approximately uncorrelated and Gaussian. Certain embodiments of this invention use a convolutional code with an overall code rate of ½ for the system, a selection bit code rate between ⅓ and ¼, inclusive, and a constraint length of 7. Optimum convolutional codes with these characteristics have been tabulated [reference: K. J. Larsen, "Short convolutional codes with maximal free distance for rates ½, ⅓, and ¼," *IEEE Transactions on Information Theory*, Vol. 19, No. 3, pp. 371–372, May 1973]. The corresponding code rate for the polarity bits is ⅔ or ¾, respectively, for the selection code rates ⅓ and ¼. The difference in performance between convolutional codes and the best known block codes for high rate (more than ½) codes is less evident and is found to depend upon the probable distribution of the errors. In general, if soft-decision information is available, the convolutional code will have better performance unless either i) very low decoded error rates are required, less than $1\times10^{-12}$, or ii) if large numbers of consecutive errors occur (correlated bursts). Although burst error statistics are common in mobile reception, the interleaving and deinterleaving processes are very effective at dispersing them so that the RF channel appears uncorrelated at the ECC decoder. High rate convolutional codes have been tabulated by Daut and others [reference: D. G. Daut, J. W. Modestino, and L. D. Wismer, "New short constraint length convolutional code constructions for selected rational rates," *IEEE Transactions on Information Theory*, Vol. 28, No. 5, pp. 794–800, September 1982].

The use of convolutional codes known as "punctured codes" is advantageous with the invention because of the simplified implementation. Suitable high rate codes have been tabulated by L. H. C. Lee and others [reference: L. H. C. Lee, "New rate-compatible punctured convolutional codes for Viterbi decoding," *IEEE Transactions on Communications*, Vol. 42, No. 12, pp. 3073–3079, December 1994]. For a constraint length of 7, useful punctured polarity bit codes at rates ⅔, ¾, ⅝, and others are derived by applying a puncturing matrix to the mother code generated by the binary polynomials 133 and 171. The rate ⅓ code for the selection bits is generated with the additional binary polynomial 145 and the rate ¼ code is generated with the additional binary polynomials 145 and 127. If the requirement for a common set of code generating polynomials (known as rate-compatibility) for both the selection and polarity bits is not present (which complicates the implementation), a rate ⅓ code with better performance (i.e. a free distance of 15 instead of 14) is generated by the binary polynomials 133, 145, and 175 and a rate ¼ code with better performance (i.e. a free distance of 20 instead of 19) is generated by the binary polynomials 135, 147, and 163.

The amount of memory required to implement deinterleaver 79 substantially determines the total amount of memory required for the receiver implementation. The additional correlation sums which must be propagated through symbol deinterleaver 79 for soft-decision decoding of both the selection and polarity bits can increase the deinterleaver memory requirement by fifty (50) percent compared to an antipodal system. In some receiver implementations, there may be insufficient memory to accommodate this increase. A block code for the polarity bits may then be preferable. A Reed-Solomon block can be used for the polarity bit ECC with only one-bit quantization (i.e. limiting) for the correlation sums determined in the receiver. Practical symbol sizes for the Reed-Solomon block code are typically between six and eight bits, inclusive. For limiting quantization and polarity bit code rates less than ¾, the concatenated code formed by appending a parity bit to each Reed-Solomon code symbol [reference: C. C. Hsu, I. S. Reed, and T. K. Truong, "Error correction capabilities of binary mapped Reed-Solomon codes with parity bits appended to all symbols," *IEEE Proceedings—Communications*, Vol. 141, No. 4, pp. 209–211, August 1994] is found to have better error performance than the Reed-Solomon block code alone.

Furthermore, for a selection bit code rate of ⅓ and a polarity bit block code rate of ⅔, it is advantageous to construct the Reed-Solomon block code so that it includes the decoded selection bits in the codeword. This adds further robustness to the selection bits because the block code may be able to correct the occasional error made in the Viterbi decoding of the encoded selection bits.

With reference to FIG. 13, in this embodiment the decoded selection bits are propagated 89 to the same ECC decoder 88 as are the polarity bits, which have not yet been decoded. This construction is defined as "partial-code-concatenation." In the conventional antipodal system or the best-case prior art non-multiplexed biorthogonal system with very high SNR value, the demodulated error rate prior to ECC decoding is approximately the same for all detected bits. The higher rate block code associated with the polarity bits is then more likely to fail (i.e. be unable to correct all errors) than the lower rate code so it is disadvantageous to include the decoded selection bits, which have been presumably encoded with a lower rate code, in the block code. However, with the method of this invention, there is a difference in SNR between the selection and polarity bits. It is surprisingly found that the high rate code (less than or equal to about ⅔) is less likely to fail than the rate ⅓ code by a small amount. Thus, extending the polarity bit codeword to include the decoded selection bits improves the selection bit error rate so that the overall decoded message error rate is approximately equal for all bits.

Figure 14:
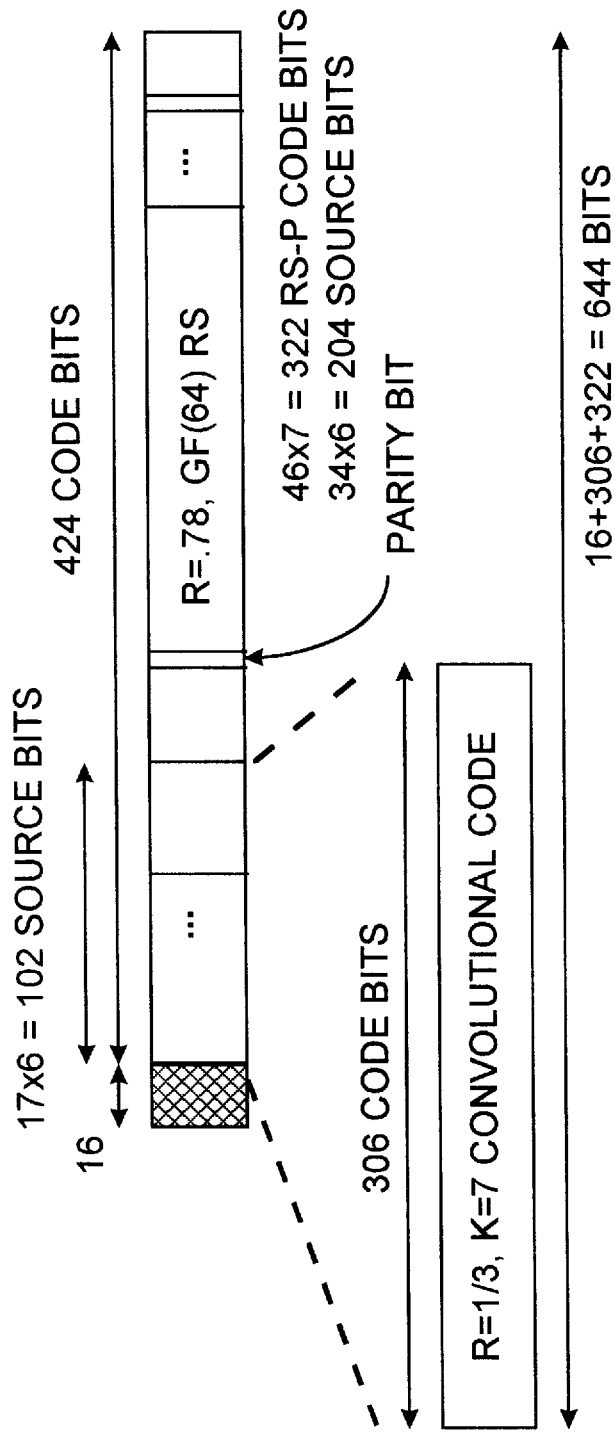
FIG. 14 is a graphical depiction of the hierarchical structure of the ECC codeword which may be used with partial-code-concatenation in the FIGS. 9—13 transmitter and receiver systems.

FIG. 14 illustrates the hierarchical structure of the partial-code-concatenation codeword when the Reed-Solomon symbol size is 6 bits; the code is over the Galois field GF(64), and the selection bits have rate ⅓ coding. In the encoding process, the plurality of one hundred two (102) source message bits corresponding to the encoded selection bits together with the plurality of two hundred four (204) source message bits corresponding to the encoded polarity bits are first encoded with the Reed-Solomon block code. Reed-Solomon codes are systematic and so the redundancy information is generated as a series of extra codeword symbols, which are appended to the encoded polarity bit sequence. Furthermore, even parity bits are appended to the Reed-Solomon codeword symbols which will not undergo further convolutional coding (i.e. the polarity bits). The encoded Reed-Solomon symbols which correspond to the selection bits and which still represent the plurality of 102 source message bits are then further encoded with the convolutional code, as described previously. The decoding process is the reverse; the convolutional code is decoded, then the parity bits, and finally the Reed-Solomon codeword.

Figure 15:
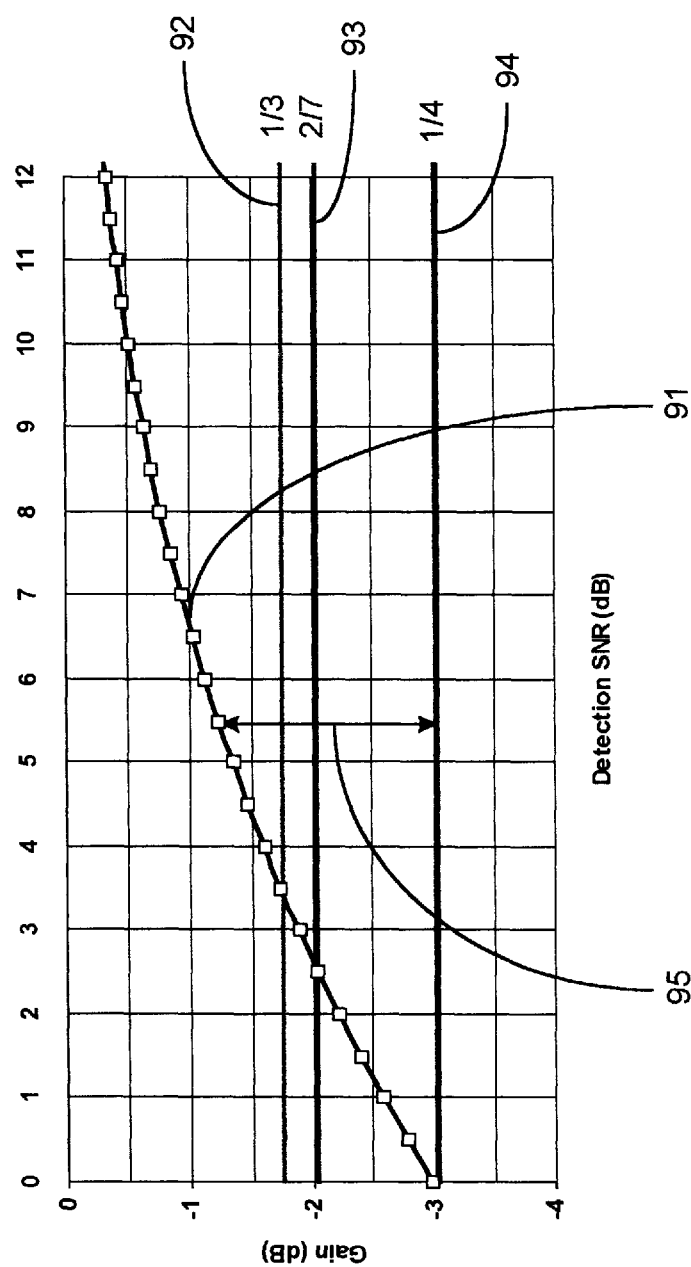
FIG. 15 is a graph which illustrates the decibel loss in effective SNR that occurs when biorthogonal modulation is used compared to antipodal modulation prior to ECC decoding. The graph also illustrates the overall decibel gain that is obtained by the use of certain embodiments of the invention, as a function of SNR.

Having described the method and system according to certain embodiments of this invention, FIG. 15 is a graph that illustrates the advantage that can be obtained by use of certain embodiments for receiver SNR values between zero (0) and twelve (12) decibels, inclusive, when the impairment is additive white Gaussian noise. The embodiment for FIG. 15 of the transmitter and receiver of the invention uses orthogonal multiplexing of biorthogonal groups with two orthogonal signals in each group (FIG. 9) and unequal error protection. The overall code rate is ½, convolutional coding with soft-decision Viterbi decoding is used for both the selection bits and polarity bits, and the constraint length is 7. The comparison system uses prior art antipodal modulation (FIGS. 1–2) and orthogonal multiplexing with a code rate of ½, uniform error protection, convolutional coding with soft-decision Viterbi detection, and the constraint length is 7. Suitable codes have already been described.

Curve 91 illustrates the loss in SNR caused by the doubling of the error probability in the demodulation of the selection bits in biorthogonal modulation prior to ECC decoding compared to antipodal modulation. The abscissa values are the decibel SNR values, $10 \cdot \log_{10}(E_s/N_{b0})$. The ordinate values are the effective decibel gain in SNR due to the use of biorthogonal modulation. The gain is always negative for curve 91 because biorthogonal modulation causes a SNR loss in the detection of the selection bits prior to ECC decoding. The loss increases as the SNR decreases, which diminishes the advantage of the method for very low SNR values.

The method allows the code rate of the selection bits to be reduced without increasing the error rate of the polarity bits compared to prior art antipodal modulation. The free distance of the rate ½ code used in the antipodal system is ten (10). The code rate of the polarity bits in the biorthogonal system can be increased so that the free distance is as small as about five (5) without causing a decrease in the performance of the decoded polarity bits when compared to antipodal modulation as a result of the polarity bit SNR advantage of certain embodiments of this invention. The approximate improvement in SNR (i.e. coding gain) due to the increase in distance brought about by the low rate selection bit ECC is shown as lines 92, 93, and 94, for selection bit code rates of ⅓, ²/₇, and ¼, respectively. The coding gain is measured relative to the uniform rate ½ code on the antipodal comparison system. The improvement due to the method in the selection bit error performance is the difference 95 between the loss curve 91 and the appropriate coding gain line. For example, when using a rate ¼ selection bit code, the polarity bit error rate is approximately equal to that of the equivalent antipodal system because the distance of the corresponding rate ¾ code for the polarity bits is 5, which is half that of that of the comparison system with a distance of 10. Thus, the entire amount of the polarity bit SNR advantage of three decibels has been utilized in order to have a very low code rate for the selection bits. When the SNR value is only 5.5 decibels, the effective improvement in SNR for the selection bits, shown in FIG. 15, is approximately 1.8 decibels, which is very significant since the comparison antipodal system already is robust, having one hundred percent (100%) redundancy in the ECC.

The surprising result is that there is an effective improvement in SNR, after decoding, even when the impairment is additive noise. The effects of crosscorrelation interference were not considered. It has already been described that the use of biorthogonal modulation substantially reduces the crosscorrelation interference due to multipath and dispersion because the number of simultaneously transmitted signals is reduced without affecting the bit rate throughput. Thus, the benefits of this invention are twofold: the crosscorrelation interference is reduced by between approximately three and six decibels in certain embodiments, and the fundamental error performance, after decoding, is improved for most SNR values. As a result, the use of this invention is found to dramatically improve the performance of a multiplexed orthogonal communication system in multipath.

The method according to certain embodiments (FIGS. 9–14) of this invention is applicable to a multiplexed transmitter and receiver system with at least two orthogonal signals, which includes OFDM modulation and synchronous Time-Division-Multiplex (TDM) modulation. However, the most significant performance gains are accomplished in systems where crosscorrelation interference is the primary impediment towards improved system performance, as is the case with wideband, spread spectrum orthogonal or approximately orthogonal signals. The method is found to work with PN codes, Gold codes, Kasami codes, Bent codes and other spreading codes described previously. The method according to certain embodiments is applicable to all known orthogonal basis signal representations, which can be normalized to have unit magnitude (known as orthonormal) including those derived by eigenvector solutions of matrix equations, which are inherently orthonormal, and by the Gram-Schmidt orthogonalization of a set of non-orthogonal basis signals [reference: G. R. Cooper, et al., ibid., pp. 206–209]. Band-limited orthogonal signals suitable for use with the invention may also be determined by methods described by R. W. Chang in "Synthesis of band-limited orthogonal signals for multichannel data transmission," *The Bell System Technical Journal*, Vol. 45, pp. 1775–1796, December 1966, and in U.S. Pat. Nos. 4,403,331 and 5,081, 645. The signals determined by the methods are implemented in the specific embodiments of the signal generators 31, 32, 39, 55, and 56.

Figure 4:
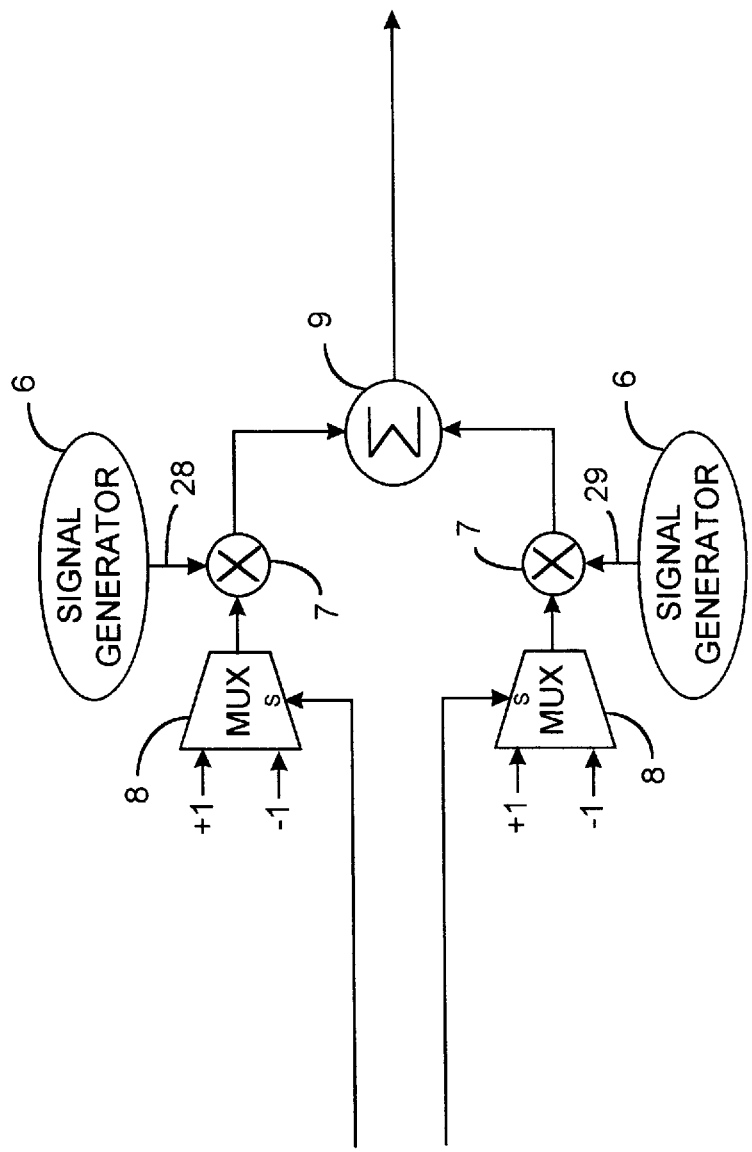
FIG. 4 is a prior art block diagram of the antipodal signal set modulator in the FIG. 1 transmitter system with two orthogonal signals being combined.

The system and method according to different embodiments of this invention (FIGS. 9–14) is applicable to a communication system whose transmitter simultaneously transmits a plurality of orthogonal signals which is a positive power of two (2). A system with two orthogonal signals, being simultaneously transmitted with antipodal modulation, where the two signals correspond to quadrature phases of the RF carrier frequency, is known as Quadrature Amplitude Modulation (QAM) or Quarternary Phase-Shifting Keying (QPSK) or a variation thereof including Differential Quarternary Phase-Shift Keying (DQPSK), and Offset Quarternary Phase-Shift Keying (OQPSK). The QPSK modulator for such a system is equivalent to that shown in FIG. 4 for the specific embodiment where the signal generators 6 correspond to the in-phase (I) and quadrature (Q) signals, which are out-of-phase with respect to each other by about ninety (90) angular degrees. In the absence of impairment, quadrature signals are orthogonal. Multipath and other frequency-selective dispersive effects cause an increase in the crosscorrelation interference between the two signals (known as crosstalk), which degrades the performance of the QPSK system. Thus, the method and system according to certain embodiments of this invention is advantageous in QPSK systems and variations thereof because of the reduction in crosscorrelation interference and the performance improvement, after decoding, in random noise. In embodiments of the invention as a replacement for QPSK systems, the QPSK modulator corresponding to FIG. 4 is replaced with the biorthogonal modulator with M=2 where either the I signal or the Q signal is transmitted, but not both, together with polarity modulation of the transmitted signal, without affecting the bit rate throughput. Similarly, the QPSK receiver is replaced with a plurality of biorthogonal demodulators according to FIGS. 11–13.

A transmitter with a QPSK modulator is further multiplexed by the simultaneous transmission of additional pairs of quadrature signals, all of the transmitted signals are pairwise orthogonal. Typically, the quadriphase signal pairs are distinguished from one another by frequency division multiplexing such as FDM or OFDM or with time-division multiplexing (TDM). The plurality of QPSK groups, each having simultaneous transmission of the I signal and the Q signal, is replaced with a plurality of biorthogonal signal groups of equal number, where either the I or Q signal is transmitted for each group, along with polarity modulation.

Once given the above disclosure, therefore, various other modifications, features or improvements will become apparent to the skilled artisan. Such other features, modifications, and improvements are thus considered a part of this invention, the scope of which is to be determined by the following claims:

I claim:

1. A transmitter for simultaneously transmitting a plurality of orthogonal signals for reception by at least one receiver, the transmitter comprising:
    first and second biorthogonal modulators, each of said biorthogonal modulators including a multiplexor for outputting one of a possible plurality M of orthogonal signals at a particular polarity;
    means for forming a composite signal from the outputs of said first and second biorthogonal modulators so that a plurality of orthogonal biorthogonally modulated signals are simultaneously transmitted as the composite signal; and
    an unequal error protection encoder for error encoding selection bits with additional redundancy compared to polarity bits.

2. The transmitter of claim 1, further comprising a symbol interleaver located between said encoder and said first and second biorthogonal modulators; and
    wherein said plurality of orthogonal signals are spread spectrum signals.

3. A method of simultaneously transmitting a plurality of orthogonal signals using a single transmitter, the method comprising the steps of:
    using simultaneous multiplexing of biorthogonal modulation to provide a plurality of orthogonal signals which are biorthogonally modulated;
    combining and simultaneously transmitting the plurality of biorthogonally modulated orthogonal signals so as to reduce crosscorrelation interference; and
    applying unequal error protection to the signals which are transmitted.

4. The method of claim 3, wherein the orthogonal signals are one of orthogonal and approximately orthogonal.

5. The method of claim 4, further comprising the step of biorthogonally modulating from a group of M orthogonal signals where $M \geq 2$; and
    wherein the plurality of orthogonal signals are spread spectrum signals.

6. A method of receiving a multiplexed composite signal including a plurality of orthogonal or approximately orthogonal biorthogonally modulated signals, each of the signals in the composite originating from a distinct biorthogonally modulated group, the method comprising the steps of:
    providing a plurality of biorthogonal demodulators;
    demodulating the received multiplexed biorthogonally modulated composite signal using said plurality of demodulators so that each of said demodulators demodulates a received biorthogonally modulated signal corresponding to one of said groups; and
    estimating selection bits prior to estimating polarity bits of the received signals in the composite, and using the estimated selection bit of a received signal to estimate the polarity bit of that signal.

7. A method of receiving a biorthogonally modulated signal including selection and polarity bits, the selection bit indicative of which of an in-phase (I) and a quadrature (Q) signal is received and the polarity bit indicative of the polarity of the received signal, the method comprising the steps of:
    receiving the biorthogonally modulated signal whereby only one of the in-phase (I) and quadrature (Q) signals is determined to have been received, the determined signal including a selection bit indicative of which of the I and Q signals is received, and a polarity bit indicative of the polarity of the determined signal;
    estimating the selection bit;
    decoding the selection bit estimate according to an error correction code;
    re-encoding the decoded selection bit estimate using the code; and
    estimating the polarity bit of the determined received biorthogonally modulated signal using the re-encoded selection bit so that the estimated selection bit indicates which of the I and Q signals was received and the polarity bit estimate is indicative of the polarity of the signal determined to have been received by way of the re-encoded selection bit.

8. The method of claim 7, further comprising the steps of:
    determining at least two correlation sums of the received signal using signal generation and correlation; and performing a normalized comparison metric on the correlation sums in order to estimate the selection bit.

9. A receiver for receiving a biorthogonally modulated signal including a selection bit indicative of which of an in-phase (I) and a quadrature (Q) signal is received and a polarity bit indicative of the polarity of the received signal, the receiver comprising:

a biorthogonal demodulator for determining which of the I and Q signals is received in a signal baud, and estimating the selection bit of the determined received signal;

a selection bit decoder for decoding the estimated selection bit in accordance with an error correction code;

a selection bit re-encoder for re-encoding the decoded selection bit estimate using the code; and a polarity bit demodulator for estimating the polarity bit using the re-encoded selection bit whereby the selection bit estimate is indicative of which of the I or Q signals was received and the polarity bit is indicative of the polarity of the signal determined to have been received by way of the re-encoded selection bit.

10. The receiver of claim 9, wherein the selection bit is error encoded with more redundancy than the polarity bit so that said selection bit decoder operates at a lower code rate than a corresponding polarity bit decoder for decoding the polarity bit estimate determined by said polarity bit demodulator.

11. A transmitter for transmitting a biorthogonally modulated unequal error protected signal including a selection bit indicative of whether an in-phase (I) or a quadrature (Q) signal is transmitted in a particular signal baud and a polarity bit indicative of the polarity of the transmitted signal, the transmitter comprising:

an encoder for error correction encoding the selection bit with more redundancy than the polarity bit so that the selection bit code rate is less than the polarity bit code rate thereby providing unequal error protection; and a biorthogonal modulator for biorthogonally modulating an encoded signal so that only one of the I and Q signals is transmitted per signal baud, whereby the selection bit is indicative of whether the I or Q signal is transmitted while the polarity bit is indicative of the polarity of the transmitted signal.

12. The transmitter of claim 11, further comprising:

a plurality of said biorthogonal modulators, each for biorthogonally modulating a signal; and means for forming a composite signal from the outputs of the plurality of biorthogonal modulators so that a plurality of orthogonal biorthogonally modulated signals (I and/or Q) are simultaneously transmitted in the signal baud as a composite signal.

13. A method of transmitting a biorthogonally modulated signal including a selection bit and a polarity bit, the method comprising the steps of:

applying unequal error protection to selection and polarity bits by error correction encoding the selection bit with more redundancy than the polarity bit, the selection bit indicative of whether an I or Q signal is to be transmitted and the polarity bit indicative of the polarity of the transmitted signal; and biorthogonally modulating the signal so that only one of the unequal error correction encoded I and Q signals is transmitted per signal interval.

14. A method of receiving a biorthogonally modulated signal with unequal error protection, the signal including a selection bit and a polarity bit, the method comprising the steps of:

receiving the biorthogonally modulated signal with unequal error protection whereby the selection bit is error correction encoded with more redundancy than the polarity bit;

biorthogonally demodulating the received signal and determining a selection bit estimate;

decoding the selection bit estimate at a first code rate;

determining a polarity bit estimate; and decoding the polarity bit estimate at a second code rate, wherein the first code rate is less than the second code rate due to the unequal error protection.

15. The method of claim 14, further comprising the steps of:

re-encoding the selection bit estimate using the same error correction code used in said selection bit decoding step; and said polarity bit determining step including using the re-encoded selection bit in determining the polarity bit.

16. A receiver for receiving a biorthogonally modulated signal including error correction encoded selection and polarity bits, the receiver comprising:

biorthogonal demodulation means for biorthogonally demodulating the received signal and determining a selection bit estimate; and decoding means for decoding error correction encoded selection and polarity bit estimates so that less encoding redundancy is needed for the polarity bits than for the selection bits thereby reducing the error rate in the receiver.

* * * * *